(12) United States Patent
Herman

(10) Patent No.: US 11,235,273 B2
(45) Date of Patent: Feb. 1, 2022

(54) FILTER ASSEMBLY WITH A DIFFUSER

(71) Applicant: CUMMINS FILTRATION IP, INC., Columbus, IN (US)

(72) Inventor: Peter K. Herman, Stoughton, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 300 days.

(21) Appl. No.: 16/473,791

(22) PCT Filed: Jan. 3, 2018

(86) PCT No.: PCT/US2018/012217
§ 371 (c)(1),
(2) Date: Jun. 26, 2019

(87) PCT Pub. No.: WO2018/129067
PCT Pub. Date: Jul. 12, 2018

(65) Prior Publication Data
US 2019/0351359 A1     Nov. 21, 2019

Related U.S. Application Data

(60) Provisional application No. 62/442,129, filed on Jan. 4, 2017.

(51) Int. Cl.
*B01D 46/00* (2006.01)
*B01D 46/10* (2006.01)
(Continued)

(52) U.S. Cl.
CPC .............. *B01D 46/10* (2013.01); *B01D 35/30* (2013.01); *B01D 29/88* (2013.01);
(Continued)

(58) Field of Classification Search
CPC .... B01D 46/10; B01D 46/24; B01D 46/0039; B01D 2275/201; B01D 35/30;
(Continued)

(56) References Cited

U.S. PATENT DOCUMENTS 2,992,659 A    7/1961  Thomas
3,279,155 A *  10/1966 Lambert .................. F16T 1/34
                                                    96/408

(Continued)

FOREIGN PATENT DOCUMENTS

WO    WO-2015/049647 A1    4/2015

OTHER PUBLICATIONS

International Search Report on PCT/US2019/039513 dated Sep. 17, 2019.
(Continued)

*Primary Examiner* — Minh Chau T Pham
(74) *Attorney, Agent, or Firm* — Foley & Lardner LLP

(57) ABSTRACT

A filter assembly includes a filter head, a port, a fitting, and a diffuser. The port extends from a portion of the filter head and defines a channel for fluid to flow into or out of the filter head. The fitting first end is attachable to the port and the fitting second end is attachable to a filtration system component. The diffuser is positionable within the channel of the port and comprises an inner surface and an outer surface. The inner surface defines an inner conical hollow region that extends at a nonzero angle between the inner conical hollow region first end and the inner conical hollow region second end such that a first inner diameter of the diffuser at the inner conical hollow region first end is smaller than a second inner diameter of the diffuser at the inner conical hollow region second end.

22 Claims, 19 Drawing Sheets

(51) Int. Cl.
*B01D 46/24* (2006.01)
*B01D 35/30* (2006.01)
*B01D 29/88* (2006.01)

(52) U.S. Cl.
CPC .......... *B01D 46/0039* (2013.01); *B01D 46/24* (2013.01); *B01D 2275/201* (2013.01)

(58) Field of Classification Search
CPC .. B01D 35/147; B01D 35/1475; B01D 29/23; B01D 29/88; B01D 29/085; B01D 29/90; B01D 29/00; B01D 29/232; B01D 29/902; B01D 2201/291; B01D 2201/302
USPC .... 55/385.1, 385.3, 521; 210/137, 437, 438, 210/446, 456, 493.2, 305, 306, 420, 457, 210/497.3
See application file for complete search history.

(56) References Cited

U.S. PATENT DOCUMENTS

| | | | |
|---|---|---|---|
| 3,743,801 A | 7/1973 | Brobeck et al. | |
| 3,939,457 A | 2/1976 | Nelson | |
| 4,020,783 A | 5/1977 | Anderson et al. | |
| 4,036,758 A | 7/1977 | Combest | |
| 4,189,724 A | 2/1980 | Onuma et al. | |
| 4,243,397 A | 1/1981 | Tokar et al. | |
| 4,436,218 A | 3/1984 | Beese | |
| 4,713,097 A * | 12/1987 | Grawi | F02M 35/14 123/198 E |
| 4,880,411 A | 11/1989 | Fangrow et al. | |
| 5,110,560 A * | 5/1992 | Presz, Jr. | F15D 1/001 422/176 |
| 5,164,558 A | 11/1992 | Huff et al. | |
| 5,222,525 A * | 6/1993 | Munroe | F16L 25/08 137/888 |
| 5,549,722 A * | 8/1996 | Zemaitis | B01D 46/2411 55/320 |
| 5,850,183 A | 12/1998 | Berry, III | |
| 6,327,902 B1 | 12/2001 | Berry et al. | |
| 6,989,104 B2 | 1/2006 | Reamsnyder et al. | |
| 7,470,360 B2 | 12/2008 | Berry, III | |
| 7,678,271 B2 | 3/2010 | Curtin | |
| 7,862,651 B2 * | 1/2011 | Stein | B01D 45/16 96/366 |
| 8,704,115 B2 | 4/2014 | Blakely | |
| 8,986,539 B2 * | 3/2015 | Herman | B01D 35/147 210/137 |
| 2005/0193695 A1 | 9/2005 | Holmes et al. | |
| 2007/0256565 A1 | 11/2007 | Sohn | |
| 2008/0022856 A1 * | 1/2008 | Clements | B01D 46/04 95/280 |
| 2009/0183565 A1 | 7/2009 | Shamoon et al. | |
| 2010/0000186 A1 * | 1/2010 | Newell | B01D 46/2411 55/418 |
| 2011/0011042 A1 * | 1/2011 | Gillingham | B01D 46/0068 55/302 |
| 2012/0074888 A1 * | 3/2012 | Maekawa | H02P 6/18 318/400.36 |
| 2013/0153685 A1 * | 6/2013 | Michael J. | B01F 3/04503 239/428.5 |
| 2016/0153595 A1 * | 6/2016 | Arvelo | F16L 21/002 285/332 |
| 2019/0039873 A1 * | 2/2019 | Aslam | B67D 1/0052 |

OTHER PUBLICATIONS

International Search Report and Written Opinion from corresponding PCT Application No. PCT/US2018/012217, dated Mar. 20, 2018, pp. 1-7.

* cited by examiner

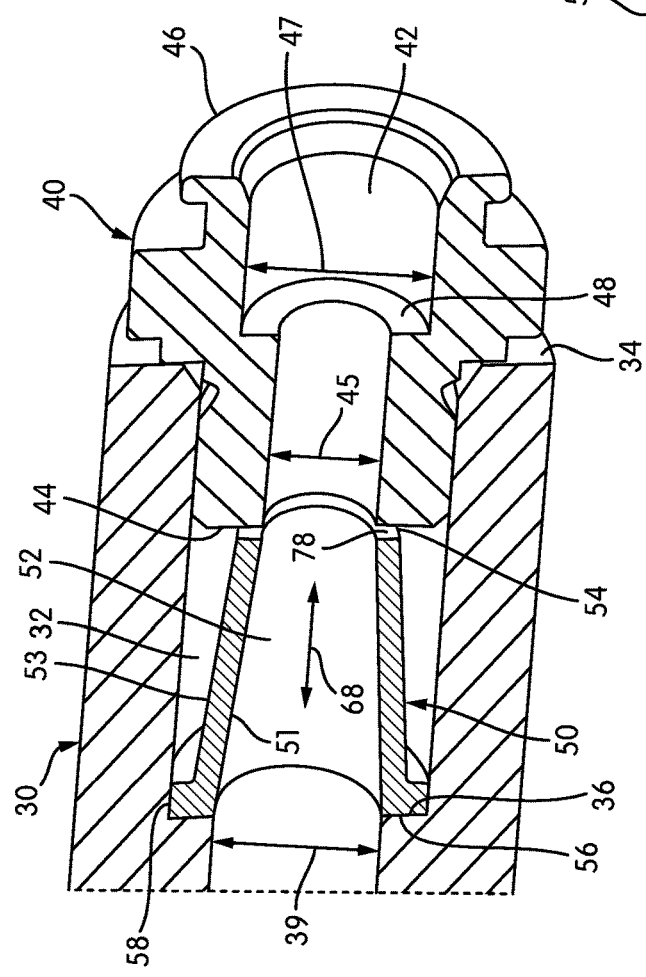
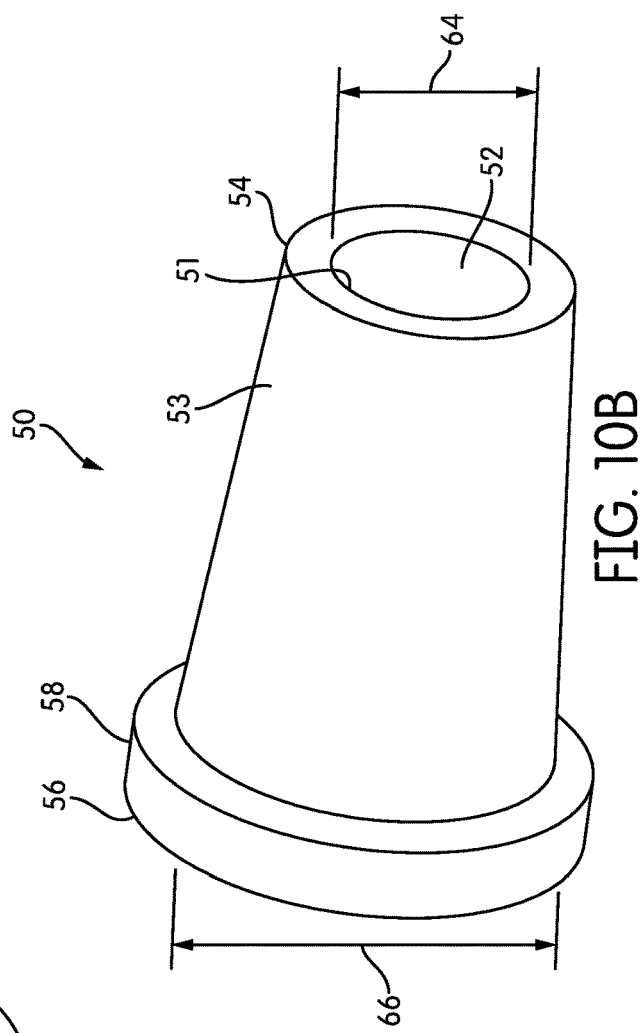
FIG. 10A
FIG. 10B

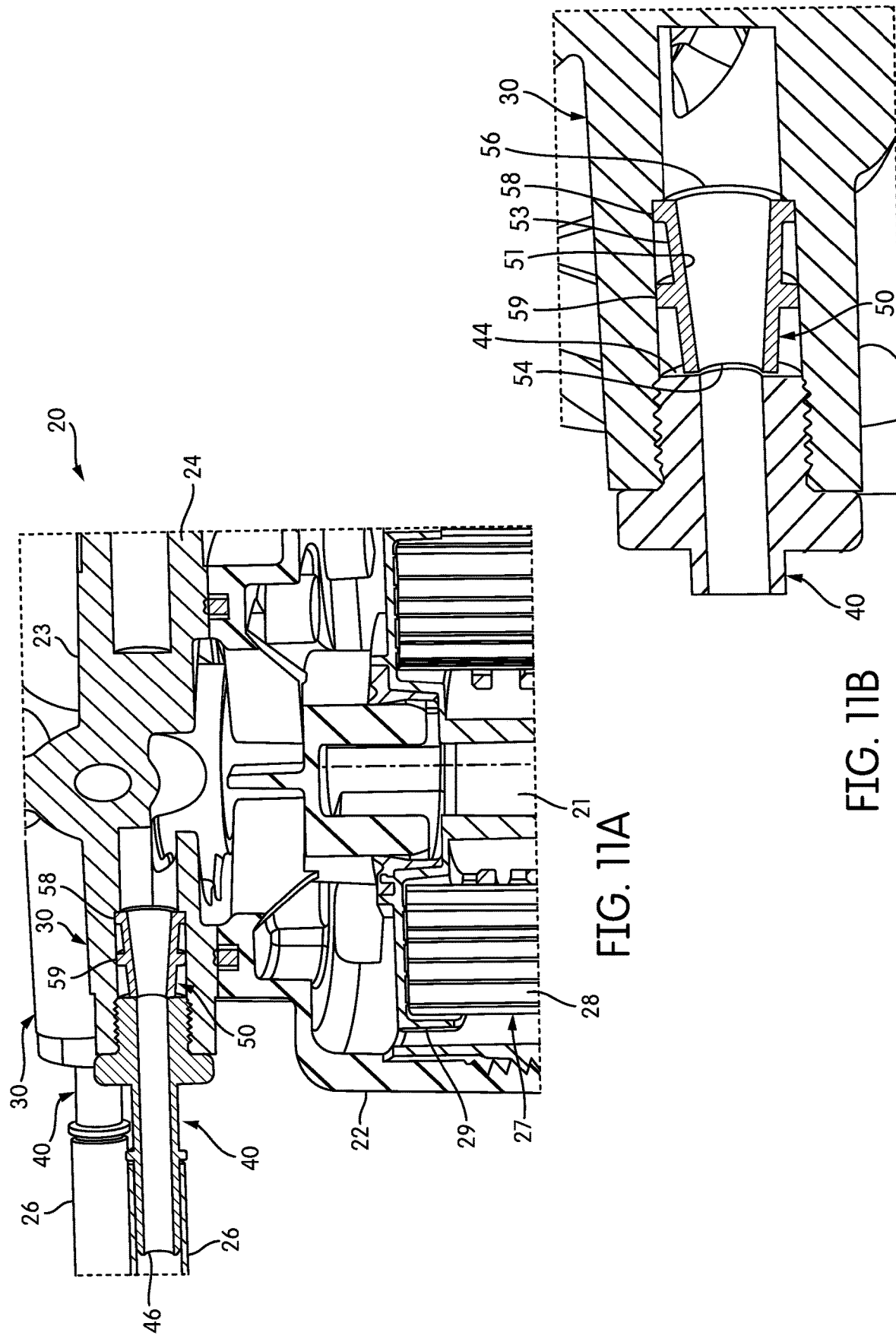

FILTER ASSEMBLY WITH A DIFFUSER

CROSS-REFERENCE TO RELATED PATENT APPLICATIONS

This application is the U.S. national phase of PCT Application No. PCT/US2018/012217, filed Jan. 3, 2018, which claims priority to and the benefit of U.S. Provisional Patent Application No. 62/442,129, filed Jan. 4, 2017, the contents of which are incorporated herein by reference in their entireties.

FIELD

The present invention relates generally to filter assemblies for filtering fluids in internal combustion engine systems.

BACKGROUND

Filter assemblies, as shown, for example, in FIGS. 1A and 2, can be used to filter various fluids. As shown in FIGS. 1A-4, conventional filter assemblies 120 can have ports 130 (e.g., inlet and/or outlet ports) that attach with a fitting 140 in order to attach to plumbing or a filtration system component 126 to the filter assembly 120 (as shown in FIGS. 2 and 4), which allows fluid to be input into or output from the filter assembly 120. As shown in FIG. 4, the filter assembly 120 may have two different ports 130 (e.g., an inlet port and an outlet port), each attached to a fitting 140, which are each attached to the filtration system component 126.

In order to provide a more efficient filter assembly 120, it is desirable to reduce or minimize the amount of pressure drop or loss within the filter assembly 120, while still minimizing the size and the cost of the filter assembly 120. It has been found in many computational fluid dynamics (CFD) simulations and tests that the majority of the total pressure loss within filter assemblies 120 (including the pressure loss within the filter housing (including the filter head) and the filter element) is a result of pressure loss at the fittings 140. For example, results of a CFD simulation of the filter assembly 120 of FIG. 1A indicate that the pressure drop at the inlet and outlet fittings 140 together cause approximately 70% of the total pressure loss, as shown in FIG. 5. This trend of pressure loss is found in a variety of different filter assemblies 120, including filter assemblies 120 in numerous different Society of Automotive Engineers (SAE) and International Organization for Standardization (ISO) standard configurations. The pressure loss is particularly problematic with liquid filter assemblies, such as filter assemblies for fuel and lube filtration.

The pressure loss at the fittings 140 may be due to the change in channel size as the fluid flows between the fittings 140 and the port 130. More specifically, the fitting 140 threads into or attaches to the port 130. In order to allow the fitting 140 to fit within the port 130, the channel of the fitting 140 must have a smaller outer diameter (and therefore also a smaller inner diameter) than the inner diameter of the port 130, as shown in FIGS. 1B, 3, and 4. The abrupt change in inner diameter between the fitting 140 and the port 130 causes an abrupt expansion or contraction of the fluid flow and a resulting abrupt increase or decrease in fluid velocity, which causes the pressure to drop.

The relatively small inner diameter of the fitting 140 creates a relatively large dynamic pressure since dynamic pressure is equal to $½*density*velocity^2$. Therefore, as the fluid flows from a channel with a relatively small inner diameter (i.e., the fitting 140) to a channel with a relatively large inner diameter (i.e., the port 130), the fluid is allowed to suddenly expand within the channel, which reduces the dynamic pressure, thus causing a loss in pressure as the fluid flows and expands into the larger channel in the port 130. Conversely, as the fluid flows from the port 130 (with a larger inner diameter) to the fitting 140 (with a smaller inner diameter), the fluid flow suddenly contracts, which reduces the dynamic pressure.

In order to avoid pressure loss at the fittings 140, larger fittings 140 may be used, but such larger fittings may greatly increase the cost of the filter assembly 120 and would require all of the associated plumbing to also be larger to match and fit with the fitting 140. Additionally, space constraints often to do not allow for the use of larger fittings 140. Alternatively, specialized or custom-designed fittings 140 with a built-in diffuser section may also be used, but such fittings may dramatically increase the cost of the filter assembly 120 since the custom-designed fittings 140 could not be used in high volumes compared to standard off-the-shelf fittings 140.

FIG. 6 depicts an inside-out filter which is described in greater detail in U.S. Pat. No. 8,986,539, the contents of which are incorporated herein by reference. In the filter of FIG. 6, a diffuser is integrated with a filter endcap of a filter element (that also includes a filter media) of an inside-out flow filter for filtering air. The diffuser is positioned within a hollow central interior area of the filter element. However, the filter does not include any standard fitting. Therefore, the diffuser is not positioned with any fitting or port to address issues related to a loss in pressure.

SUMMARY

Various embodiments provide for a filter assembly that comprises a filter head, a port, a fitting, and a diffuser. The port extends from a portion of the filter head and defines a channel for fluid to flow into or out of the filter head. The fitting extends between a fitting first end and a fitting second end thereof. The fitting first end is attachable to the port and the fitting second end is attachable to a filtration system component. The diffuser is positionable within the channel of the port. The diffuser comprises an inner surface and an outer surface. The inner surface defines an inner conical hollow region extending between an inner conical hollow region first end and an inner conical hollow region second end. The inner surface extends at a nonzero angle relative to the direction of flow between the inner conical hollow region first end and the inner conical hollow region second end such that a first inner diameter of the diffuser at the an inner conical hollow region first end is smaller than a second inner diameter of the diffuser at the an inner conical hollow region second end.

Various other embodiments provide for a filter assembly that comprises a filter body, a port, and a diffuser. The port extends from a portion of the filter body and defines a channel for fluid to flow into or out of the filter body. The port is attachable to a fitting first end of a fitting. The diffuser is positionable within the channel of the port. The diffuser comprises an inner surface and an outer surface. The inner surface defines an inner conical hollow region that extends between an inner conical hollow region first end and an inner conical hollow region second end. The inner surface extends at a nonzero angle relative to the direction of flow between the inner conical hollow region first end and the inner conical hollow region second end such that a first inner diameter of the diffuser at the inner conical hollow region first end is smaller than a second inner diameter of the diffuser at the inner conical hollow region second end.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 10A is a cross-sectional view of a port, a diffuser, and a fitting of a filter assembly according to yet another embodiment.

FIG. 10B is a perspective view of the diffuser of FIG. 10A.

FIG. 11A is a cross-sectional view of a portion of a filter assembly according to still another embodiment.

FIG. 11B is an enlarged view of a portion of the filter assembly of FIG. 11B.

DETAILED DESCRIPTION

Referring to the figures generally, various embodiments disclosed herein relate to a filter assembly that comprises a filter housing, a filter head, a port, a filter element, a fitting, and a diffuser. The diffuser reduces or minimizes pressure loss within the filter assembly. Accordingly, due to the diffuser, the fluid only has a slight change in velocity while flowing between the port and the fitting of the filter assembly. Accordingly, the diffuser improves the fuel economy of the filter assembly and allows more compact packaging compared to conventional filter assemblies.

Filter Assembly

Figure 7:
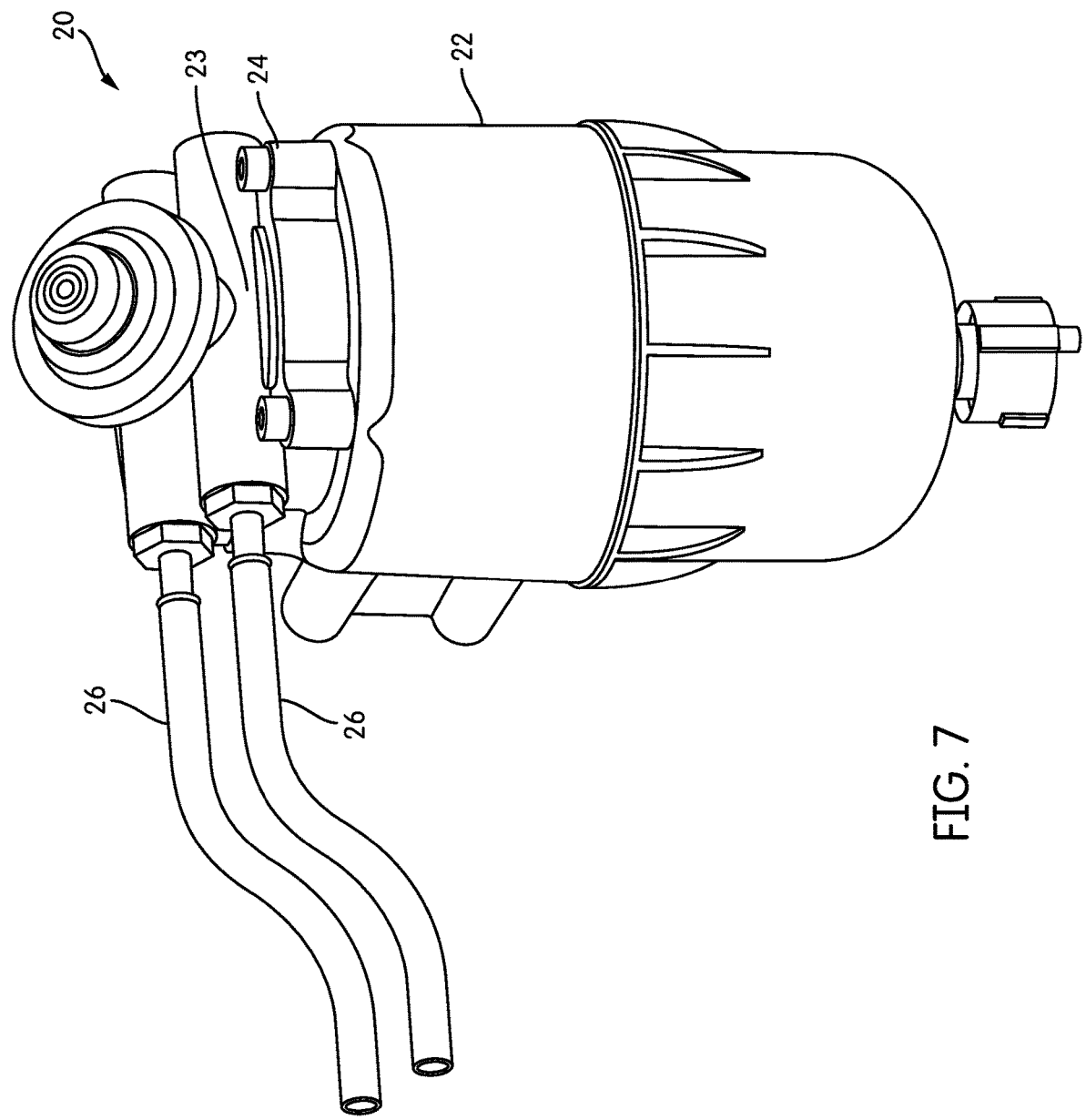
FIG. 7 is a perspective view of a filter assembly according to one embodiment.

The filter assembly 20 (as shown in FIG. 7) is configured to filter a fluid and comprises a filter housing 22, a filter head 24, and a filter element 27 that is positioned within the filter housing 22. The filter assembly 20 may be used for liquid filtration, such as fuel, lube, or hydraulic filtration. Accordingly, the fluid may be, in particular, a liquid such as fuel, lube, or a hydraulic fluid. The filter assembly 20 may have a conventional outside-in flow configuration.

Figure 8:
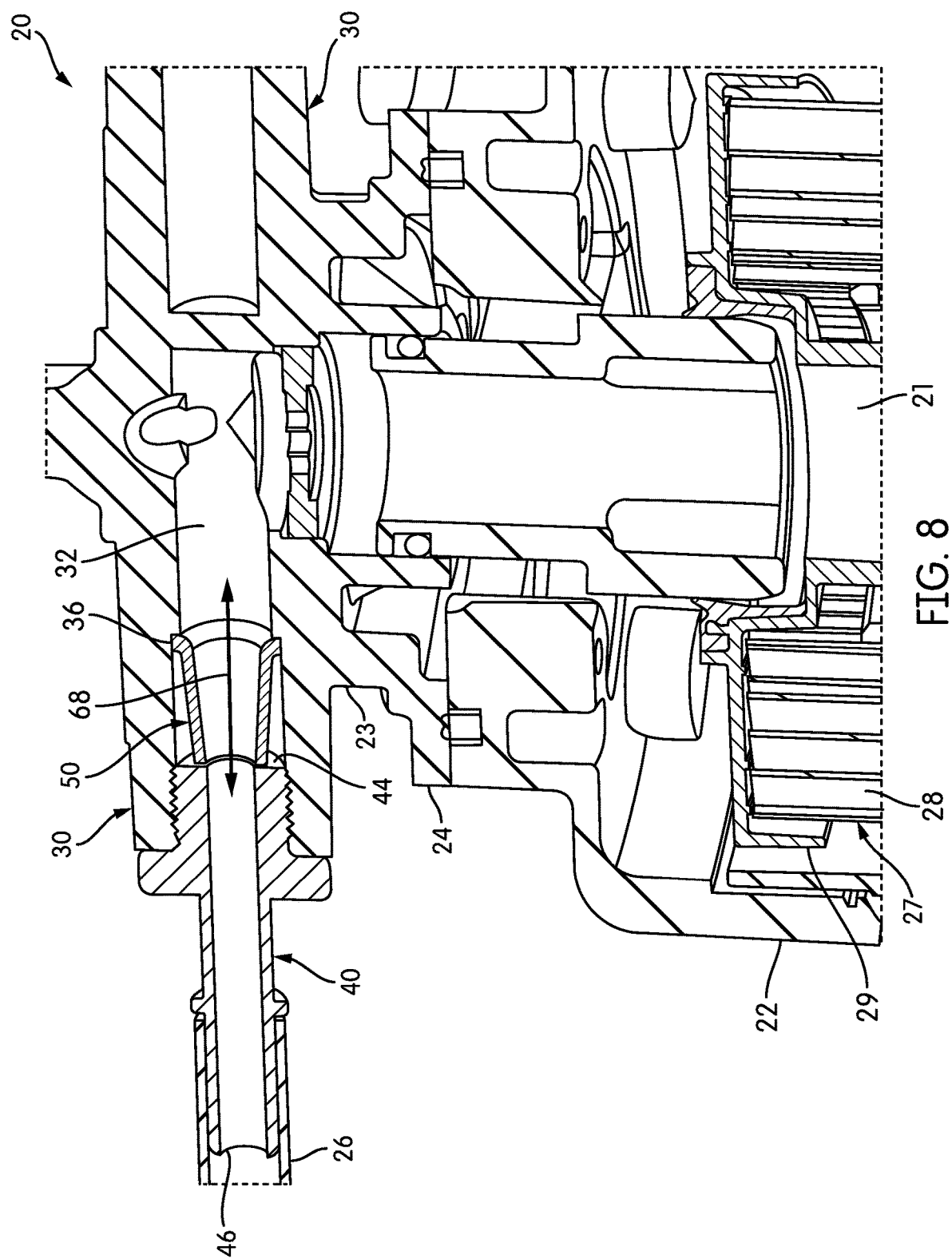
FIG. 8 is a cross-sectional view of a portion of the filter assembly of FIG. 7.

The filter element 27 is configured to filter the fluid. Accordingly, as shown in FIGS. 8 and 11A, the filter element 27 comprises a filter media 28 and at least one endplate or endcap 29. The endcaps 29 may be positioned on distally opposite respective axial ends of the filter element 27. According to one embodiment, the filter element 27 comprises a central area or hollow interior 21 defined by the filter media 28 and/or the endcap 29.

As shown in FIGS. 7-8 and 11A, the filter shell or housing 22 is removably connected or attachable to the filter head 24. According to one embodiment, the filter housing 22 is configured to house or contain the filter element 27.

The filter head 24 allows for the remainder of the filter assembly 20 to operatively connect to other components or devices, such as an engine system. In order to allow fluid to enter or exit the filter housing 22, at least one casting or port 30 extends from a wall or portion 23 of the filter head 24. Although the port 30 is shown as part of and extending from the filter head 24, it is understood that the filter assembly 20 may have a filter body (for example the filter head 24 and/or the filter housing 22), and the port 30 may extend from other areas of the filter assembly 20, such as the filter body.

Figure 15:
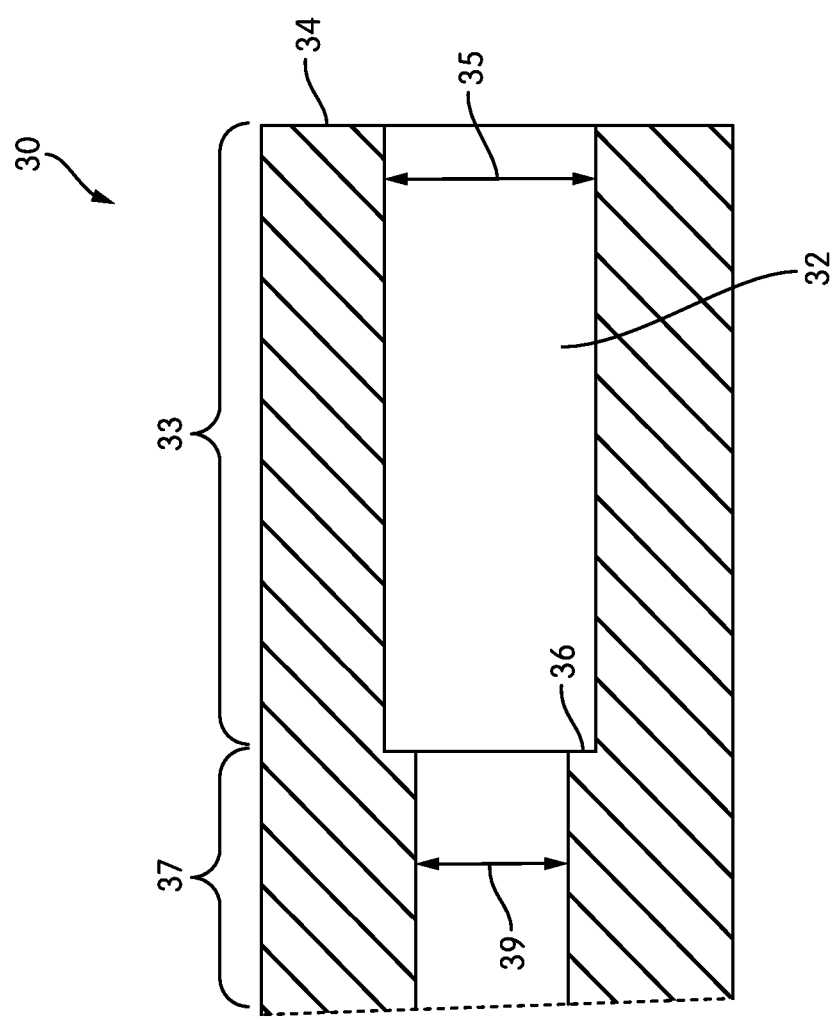
FIG. 15 is a cross-sectional view of a port of a filter assembly according to one embodiment.

The port 30 can be a fluid entry or inlet port or a fluid exit or outlet port in order to allow fluid to flow into the filter assembly 20 to be filtered or out from the filter assembly 20 after filtration, respectively. The port 30 may optionally be a part of the filter head 24. The outermost end 34 of the port 30 attaches with a fitting 40 (as shown, for example, in FIG. 10A), which attaches to a filtration system component 26. As shown in FIG. 15, the port 30 comprises a distal region 33 and a proximal region 37. The distal region 33 of the port 30 is an area of the port 30 that is closest to (and comprises) the outermost end 34 of the port 30 and the proximal region 37 of the port 30 is an area of the port 30 that is further from the outermost end 34 (relative to the distal region 33) and closer to a central region of the entire filter assembly 20. The inner diameter 39 of the proximal region 37 of the port 30 is less than the inner diameter 35 of the distal region 33 of the port 30.

As further shown in FIG. 15, the port 30 defines an aperture, passageway, hole, bore, cavity, or channel 32 in order to provide an area for fluid to flow into or out of the filter housing 22. The channel 32 extends from the outermost end 34 of the port 30, through the distal region 33 of the port 30, through the proximal region 37 of the port 30, and into a central region of the filter assembly 20 (as shown in FIG. 8).

Figure 12A:
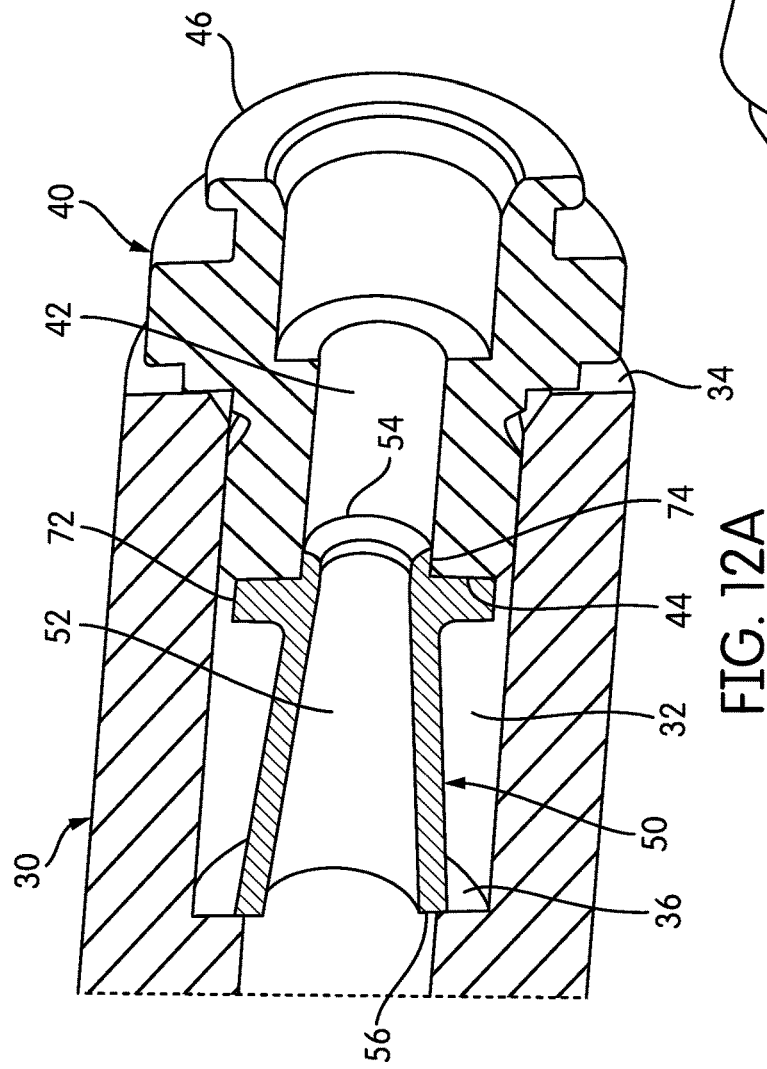
FIG. 12A is a cross-sectional view of a port, a diffuser, and a fitting of a filter assembly according to another embodiment.
Figure 13A:
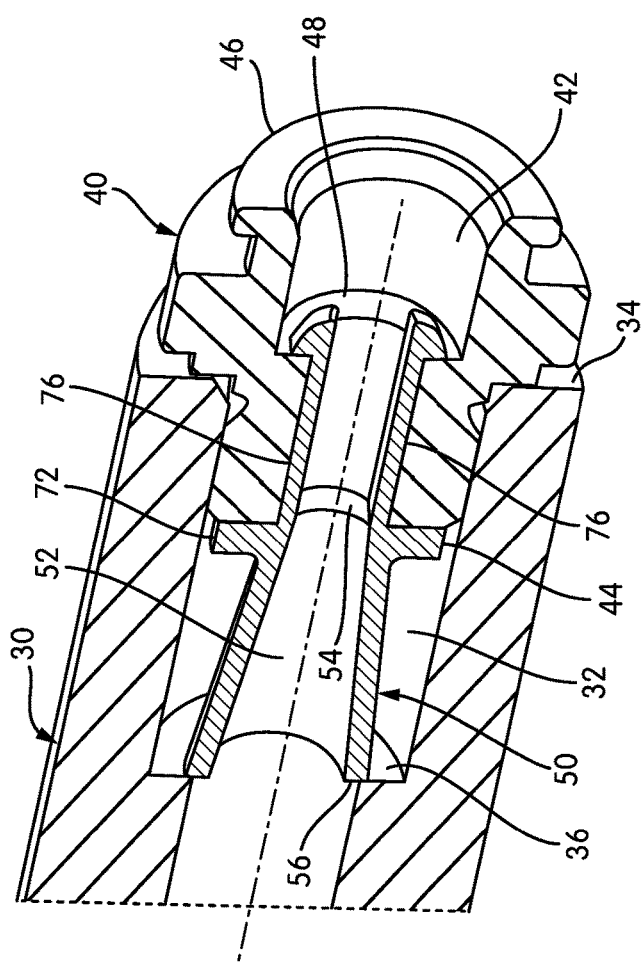
FIG. 13A is a cross-sectional view of a port, a diffuser, and a fitting of a filter assembly according to yet another embodiment.

As shown in FIGS. 12A, 13A, and 15, the port 30 comprises a lip or ledge 36 within the channel 32 that divides the inner or proximal region 37 and the outer or distal region 33. The ledge 36 extends at least partially around the inner circumference of the port 30 and extends inwardly into the center of the channel 32 such that the inner diameter 39 of the proximal region 37 of the port 30 is less than the inner diameter 35 of the distal region 33 of the port 30.

As shown in FIG. 8, the filter assembly 20 further comprises at least one bore, cavity, or fitting 40 that is coupled, connected, or attached to the port 30. Each of the ports 30 is paired with a fitting 40 in order to allow the ports 30 to fluidly connect or attach to a filtration system component 26, such as plumbing, another device or component, or a tubing through each of the fittings 40 such that fluid can enter into the filter assembly 20 or exit from the filter assembly 20. The fittings 40 can be entry or inlet fittings or exit or outlet fittings, depending on which port 30 the fitting 40 is attached to. The fittings 40 may be stock or standard off-the-shelf fittings, which may be relatively small. As shown in FIGS. 8-9 and 11A-11B and FIGS. 10A, 12A, 13A, and 14, a variety of different types of fittings 40 can be used within the filter assembly 20 and in conjunction with the diffuser 50.

The fitting 40 extends between a fitting first exit point, entrance, or end 44 and a fitting second exit point, entrance, or end 46 along the direction 68 of flow of fluid. The fitting 40 defines an aperture, passageway, hole, or channel 42 that extends from the fitting first end 44 to the fitting second end 46 in order to provide an area for fluid to flow within along the entire length of the fitting 40. As shown in FIG. 8, the fitting first end 44 of the fitting 40 is inserted into (and through) the outermost end 34 in the distal region 33 of the channel 32 of the port 30 such that the fitting first end 44 is attached to the port 30 and is positioned within the distal region 33 of the port 30. The fitting second end 46 of the fitting 40 extends out from the port 30 and connects or attaches to the filtration system component 26. According to one embodiment, the fitting second end 46 is inserted into the filtration system component 26.

As shown in FIG. 10A, the fitting 40 comprises a lip or ledge 48 within the channel 42. The ledge 48 extends at least partially around the inner circumference of the fitting 40 and extends inwardly into the channel 42. The ledge 48 transitions and divides the channel 42 of the fitting 40 between a smaller inner diameter 45 at the fitting first end 44 and a larger inner diameter 47 at the fitting second end 46. Accordingly, the inner diameter 45 at the fitting first end 44 is less than the inner diameter 47 at the fitting second end 46. It is understood that the inner diameter 45 at the fitting first end 44 and the inner diameter 47 at the fitting second end 46 refer to the inner diameter of areas of the fitting 40 that are not part of a chamfered, sloped, or angled edge.

The fitting 40 can attach to the port 30 in a variety of ways. For example, as shown in FIG. 8, the fitting 40 is attached to the port 30 with a threaded attachment. Accordingly, the fitting 40 is screwed into the port 30. In order to fit within the port 30, the outer diameter of the fitting 40 (specifically along the region of the fitting 40 with the smaller inner diameter 45) is sized to fit within the inner diameter of the port 30 (specifically within the distal region 33 of the port 30) within the channel 32. Accordingly, the throat or inner diameter 45 (and the outer diameter) of the fitting first end 44 is smaller or more constricted than the inner diameter 35 in the distal region 33 of the port 30.

The length of the portion of the fitting 40 (that has an outer diameter smaller than the inner diameter 35 of the distal region 33 of the port 30, e.g., the portion of the fitting 40 that fits within the port 30) is shorter than the length of the distal region 33 of the port 30. Accordingly, there is a gap along the length of the port 30 between the first fitting end 44 of the fitting 40 and the ledge 36 of the port 30 that the diffuser 50 fits within, as described further herein. Without the diffuser 50 within the port 30, there is an abrupt increase and decrease in diameter of fluid flow as incoming fluid moves radially outward out of the first end 44 of the fitting 40, into the distal region 33 of the port 30, and radially inward past the ledge 37 and into the proximal region 37 of the port 30 (or vice versa with the outgoing fluid flowing in the opposite direction). Although the fitting 40 does not extend far enough into the port 30 to abut the ledge 36 of the port 30, the inner diameter 45 of the fitting 40 is also smaller than the inner diameter 39 of the proximal region 37 of the port 30.

Diffuser

The filter assembly 20 further comprises an insert or diffuser 50 positionable within the channel 32 of the port 30. The diffuser 50 is used with, connected to, or integrated with the port 30 and the fitting 40 to restrict and guide the fluid flow between a smaller first inner diameter 64 and a larger second inner diameter 66 of the diffuser 50 (and therefore between the fitting 40 and the proximal region 37 of the port 30). The diffuser allows the fluid to more slowly expand (or contract) in a controlled manner through the inner conical hollow region 52 of the diffuser 50 as the fluid flows between the fitting 40 and the port 30. Accordingly, the diffuser 50 reduces the change in pressure, which reduces pressure loss or drop of the fluid within the filter assembly 20 and recovers at least some of the dynamic pressure or velocity of the fluid that would otherwise be lost due to the necessarily smaller inner diameter 45 of the fitting 40 (relative to the inner diameters 35, 39 of the port 30).

The diffuser 50 transitions the majority of the fluid flow between the relatively smaller inner diameter 45 of the fitting 40 to the relatively larger inner diameter 39 of the port 30, which minimizes or reduces dynamic pressure loss. This configuration also minimizes or completely prevents fluid flow from entering into the large inner diameter 35 of the port 30, which further minimizes or reduces dynamic pressure loss.

Figure 12B:
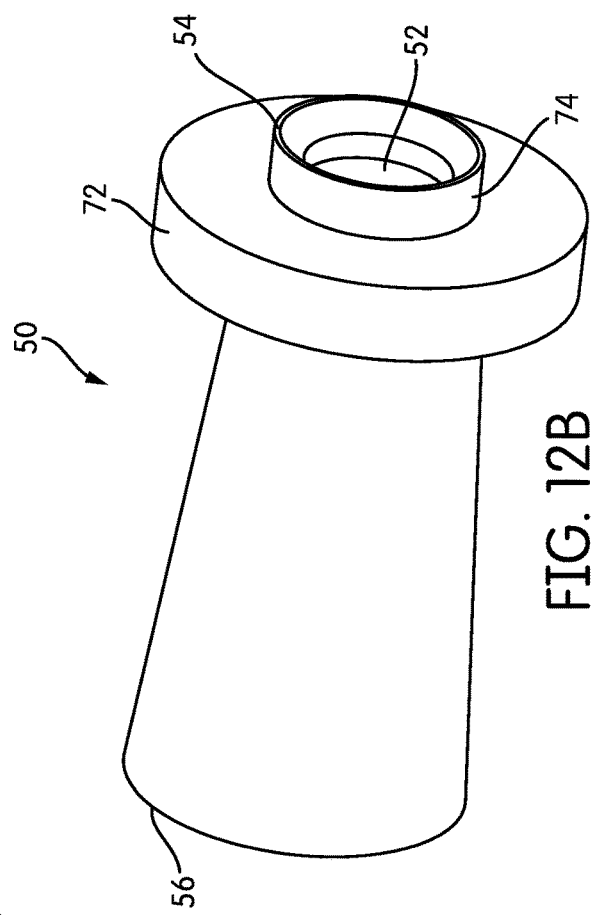
FIG. 12B is a perspective view of the diffuser of FIG. 12A.
Figure 13B:
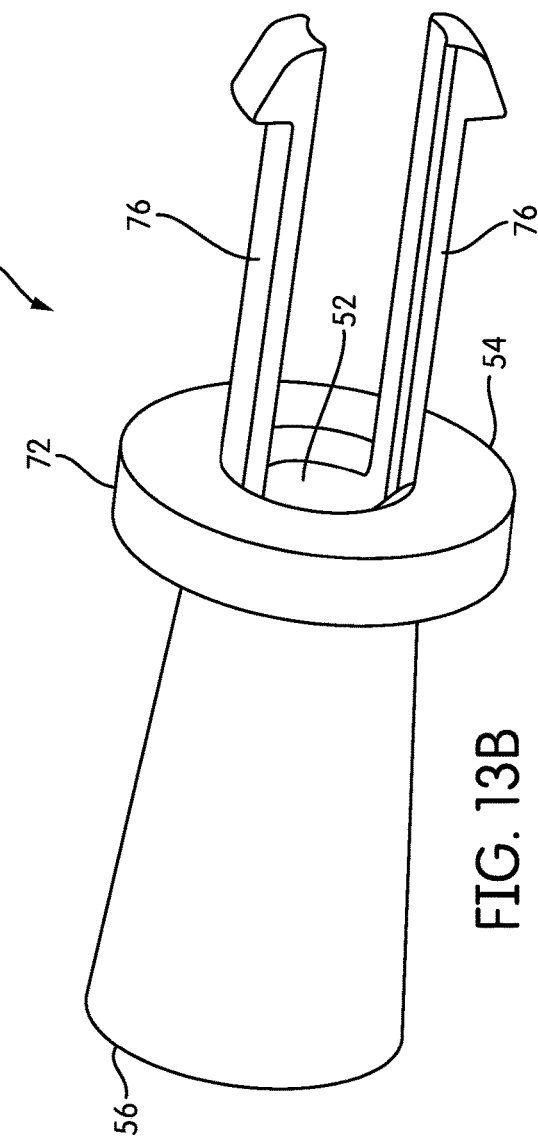
FIG. 13B is a perspective view of the diffuser of FIG. 13A.

As shown in FIG. 10A, the diffuser 50 comprises an inner surface 51 and an outer surface 53. The inner surface 51 defines the aperture, passageway, hole, channel, or inner conical hollow region 52 of the diffuser 50. Accordingly, the diffuser 50 is a conical diffuser and have a hollow conical shape, as shown in FIGS. 10B, 12B, and 13B. The inner conical hollow region 52 extends between an inner conical hollow region first entrance or end 54 and an inner conical hollow region base or second entrance or end 56 along the direction of fluid flow. Accordingly, the inner conical hollow region 52 either conically contracts or expands the fluid flow between the inner conical hollow region first end 54 and the inner conical hollow region second end 56.

The inner surface 51 of the diffuser 50 extends at a nonzero, constant angle (relative to the direction 68 of flow) and in a substantially straight, uninterrupted line (around the entire inner circumference of the diffuser 50) between the inner conical hollow region first end 54 and the inner conical hollow region second end 56 (aside from any curvature, chamfer, or taper at either end of the diffuser 50 according to some embodiments). Accordingly, as shown in FIG. 10B (for example), the first inner diameter 64 of the diffuser 50 at the inner conical hollow region first end 54 of the inner conical hollow region 52 is smaller than the second inner diameter 66 of the diffuser 50 at the inner conical hollow region second end 56 of the inner conical hollow region 52. It is understood that the first inner diameter 64 at the inner conical hollow region first end 54 and the second inner diameter 66 at the inner conical hollow region second end 56 refer to the inner diameter of areas of the inner conical hollow region 52 that are not part of a chamfered, sloped, or angled edge.

Figure 16:
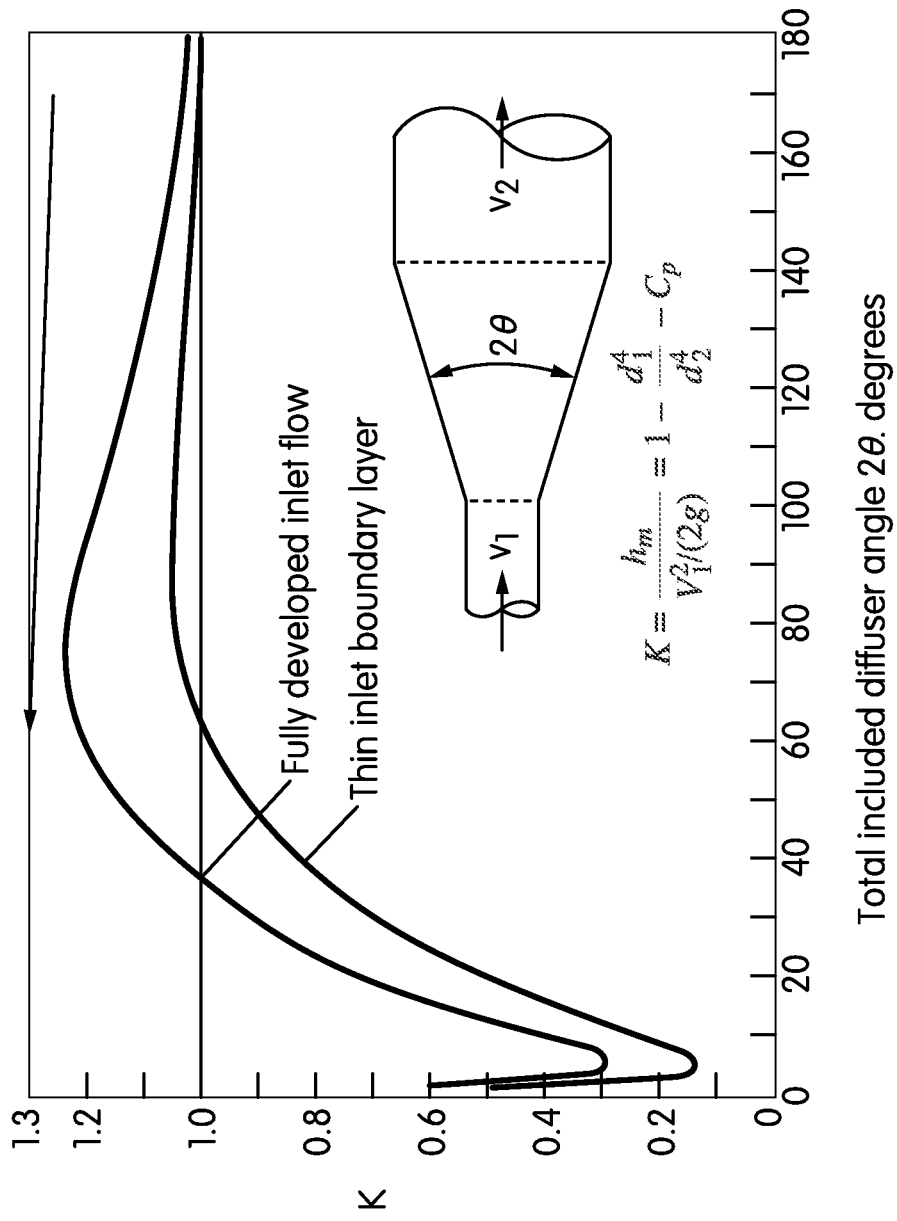
FIG. 16 is a graph of the K-factor of a diffuser as a function of the diffuser angle.

The angle of the inner surface 51 may be determined by the relative inner diameters of the port 30 and the fitting 40, the desired performance, and the distance between the ledge 36 of the port 30 and the fitting first end 44. The performance of the diffuser 50, which depends on the angle of the inner surface 51, is optimal at a low loss coefficient or K-factor, where change in pressure (dP)=k*$P_{dynamic}$. For example, if the K-factor is 1, all of the fluid velocity is lost. If the K-factor is 0, none of the fluid velocity is lost. FIG. 16 depicts the K-factor of diffusers with inner surfaces at different angles, where fluid moves within the diffusers from a channel with a small diameter to channel with a large diameter. If the angle of the inner surface 51 of the diffuser 50 too abrupt, the diffuser 50 may stall or impede the fluid flow. As shown in FIG. 16, an inner surface 51 with an angle of 5-15° provides the lowest K-factor.

Accordingly, the angle of the inner surface 51 of the diffuser 50 may be between approximately 5 to 20°. According to another embodiment, the angle of the inner surface 51 is between approximately 5 to 15°. According to other embodiments, the angle of the inner surface 51 is approximately 7° or approximately 10° (as shown in FIG. 12A).

The diffuser 50 is inserted into and attached to the port 30 and/or the fitting 40. According to one embodiment, at least a portion of the diffuser 50 is positioned in the distal region 33 within the channel 32 of the port 30, between the ledge 36 of the port 30 and the fitting first end 44. Accordingly, the largest outer diameter of the diffuser 50 is smaller than the inner diameter 35 in the distal region 33 of the port 30 such that the diffuser 50 fits within the distal region 33 of the port 30. As described further herein, the entire diffuser 50 (as shown in FIG. 10A) or only a portion of the diffuser 50 (as shown in FIGS. 12A-13B) is positioned between the ledge 36 of the port 30 and the fitting first end 44. According to one embodiment, the outer diameter at the inner conical hollow region second end 56 is larger than the inner diameter 39 of the proximal region 37 of the port 30 such that the diffuser 50 is not positioned within the proximal region 37 of the port 30. According to one embodiment, the diffuser 50 is not within the hollow interior 21 of the filter element 27.

The diffuser 50 is secured directly to the port 30 and/or to the fitting 40, as described further herein. For example, FIGS. 10A-10B show how the diffuser 50 within the filter assembly 20 can be secured only to the port 30 while FIGS. 12A-12B and 13A-13B show how the diffuser 50 can be secured only to the fitting 40.

In order to facilitate a smooth flow of fluid and to control the expansion or contraction of the fluid as the fluid flows between the port 30 and the fitting 40, the diffuser 50 gradually transitions the flow of fluid between the smaller inner diameter 45 of the fitting 40 and the larger inner diameter 39 of the port 30, as shown in FIGS. 9, 10A, 11A-11B, 12A, 13A, and 14. Accordingly, the first inner diameter 64 at the inner conical hollow region first end 54 is approximately equal to (or slightly greater than or less than) the inner diameter 45 at the fitting first end 44. Additionally, the second inner diameter 66 at the inner conical hollow region second end 56 is less than the inner diameter 35 of the distal region 33 of the port 30 and is approximately equal to (or slightly greater than or less than) the inner diameter 39 of the proximal region 37 of the port 30.

According to one embodiment as shown in FIGS. 10A-10B and 13A-13B, the first inner diameter 64 at the inner conical hollow region first end 54 is substantially equal to the inner diameter 45 at the fitting first end 44 and the second inner diameter 66 at the inner conical hollow region second end 56 is substantially equal to the inner diameter 39 of the proximal region 37 of the port 30 in order to prevent any sudden or abrupt expansion or contraction of the fluid flow. By providing a constant diameter into and out from the diffuser 50, the area loss of the fluid flow is minimized, which minimizes the dynamic pressure loss.

However, as shown in FIGS. 8 and 11A-11B, the first inner diameter 64 at the inner conical hollow region first end 54 is slightly greater than the inner diameter 45 at the fitting first end 44. As shown in FIGS. 12A-12B, the first inner diameter 64 at the inner conical hollow region first end 54 is less than the inner diameter 45 at the fitting first end 44.

Furthermore, as shown in FIGS. 8-9 and 11A-13B, the second inner diameter 66 at the inner conical hollow region second end 56 is slightly less than the inner diameter 39 of the proximal region 37 of the port 30. It is understood that second inner diameter 66 at the inner conical hollow region second end 56 may be slightly greater than the inner diameter 39 of the proximal region 37 of the port 30

As shown in FIGS. 9-13B, the diffuser 50 may have a variety of different configurations and components, according to the desired design.

As shown in FIGS. 10A-10B, the diffuser 50 is configured to be inserted or press-fit into the channel 32 of the port 30. The first inner diameter 64 at the inner conical hollow region first end 54 is approximately equal to the inner diameter 45 of the fitting first end 44 and the second inner diameter 66 at the inner conical hollow region second end 56 is approximately equal to the inner diameter 39 of the proximal region 37 of the port 30 in order to provide smooth transitions for the fluid flow between the fitting 40, the diffuser 50, and the port 30.

According to one embodiment as shown in FIGS. 10A-10B, the length of the diffuser 50 is sized to fit between the ledge 36 of the port 30 and the fitting first end 44. According, the length of the diffuser 50 is approximately equal to the distance between the ledge 36 of the port 30 and the fitting first end 44 such that the entire diffuser 50 is positioned between the ledge 36 of the port 30 and the fitting first end 44 and the diffuser 50 does not extend into the inner diameter 45 of the fitting 40 or into the proximal region 37 of the port 30.

The length of the diffuser 50 may be slightly less than the distance between the ledge 36 of the port 30 and the fitting first end 44 in order to create a small space or gap 78 between the inner conical hollow region first end 54 and fitting first end 44, as shown in FIG. 10A. Accordingly, when the fitting 40 is inserted into the outermost end 34 of the channel 32 of the port 30 and is fully attached to the port 30, the fitting 40 does not crush the diffuser 50 against the ledge 36 during attachment.

According to various embodiments as shown, for example, in FIGS. 10A-10B and 11A-11B, the diffuser 50 comprises a first circumferential ring 58. Alternatively or additionally, the diffuser 50 can optionally comprise a second circumferential ring 59, as shown in FIGS. 11A-11B. The first ring 58 and the second ring 59 extend radially outwardly around the entire outer periphery of the outer surface 53 of the diffuser 50 and can have a larger outer diameters than other portions of the diffuser 50. The outer diameters of the first ring 58 and the second ring 59 are less than the inner diameter 35 of the distal region 33 of the port 30 and greater than the inner diameter 39 of the proximal region 37 of the port 30 such that the diffuser 50 (including the first ring 58 and the second ring 59) fits within the distal region 33 of the port 30 but does not fit within the proximal region 37 of the port 30. The outer diameters of the first ring 58 and the second ring 59 may be substantially equal. Both the first ring 58 and the second ring 59 may be press-fit into the channel 32 of the port 30.

The first ring 58 and the second ring 59 are positioned along the length of the diffuser 50. More specifically, the first ring 58 is positioned at the inner conical hollow region second end 56. Accordingly, one side of the first ring 58 directly abuts the ledge 36 of the port 30, which prevents the diffuser 50 from moving further into the port 30. The second ring 59 may be positioned in a middle region of the diffuser 50 or on the inner conical hollow region first end 54 of the diffuser 50 such that the second ring 59 is spaced from the first ring 58 along the length of the diffuser 50.

As shown in FIGS. 12A-12B, a portion of the diffuser 50 fits within the inner diameter 45 at the fitting first end 44. Accordingly, the diffuser 50 is inserted or press-fit into the fitting first end 44 of the channel 42 and the fitting 40 is also attached to the port 30.

The diffuser 50 comprises a flange or extension 72 that extends radially outwardly around the outer periphery of the outer surface 53 of the diffuser 50 and is positioned near the inner conical hollow region first end 54 of the diffuser 50. The outer diameter of the extension 72 is larger than the inner diameter 45 of the fitting 40 at the fitting first end 44 but is smaller than the inner diameter 35 of the distal region 33 of the port 30 such that the extension 72 does not fit within the fitting 40 but does fit within the distal region 33 of the port 30. The extension 72 helps minimize further contraction loss caused by the material thickness of the diffuser 50.

In order to fit within the fitting first end 44, the inner conical hollow region first end 54 of the diffuser 50 comprises a lip 74 that extends lengthwise (i.e., along the length of the diffuser 50) beyond the extension 72. In the embodiment in which the diffuser 50 comprises the lip 74, the inner conical hollow region first end 54 is positioned at the end of the lip 74 (at the opposite side of the lip 74 as the extension 74). As shown in FIG. 12A, the outer diameter of the lip 74 of the inner conical hollow region first end 54 is less than the inner diameter 45 at the fitting first end 44 such that the inner conical hollow region first end 54 of the diffuser 50 fits within, extends into, and is insertable into the channel 42 at the fitting first end 44 of the fitting 40.

The length of the diffuser 50 in FIGS. 12A-12B is sized such that the inner conical hollow region second end 56 and the extension 72 of the diffuser 50 fits between the ledge 36 of the port 30 and the fitting first end 44 when the fitting 40 is engaged with the port 30. The extension 72 directly abuts the fitting first end 44 and the inner conical hollow region second end 56 terminates just prior to reaching the ledge 36 of the port 30. Accordingly, the diffuser 50 recovers the maximum possible dynamic pressure prior to flowing into a larger channel (e.g., the port 30).

As shown in FIGS. 13A-13B, the diffuser 50 is configured to be partially snap-fit into the channel 42 of the fitting 40. Accordingly, the diffuser 50 comprises at least one snap or projection 76 that extends beyond the extension 72 and the inner conical hollow region first end 54 in a lengthwise direction (of the diffuser 50) that is away from the inner conical hollow region second end 56. The projections 76 are configured to extend and be inserted into the channel 42 at the fitting first end 44 of the fitting 40 and then snap fit with a portion or end of the channel 42 (such as the ledge 48) of the fitting 40, thereby attaching and securing the diffuser 50 directly to the fitting 40. The projections 76 may extend or snap fit with the ledge 48 of the fitting 40. The fitting 40 may still be attachable to the port 30. As shown in FIG. 13B, the diffuser 50 comprises two projections 76 that are substantially opposite each other around the inner perimeter of the diffuser 50. However, it is understood that the diffuser 50 can comprise any number of projections 76.

The length of the diffuser 50 in FIGS. 13A-13B is sized such that the inner conical hollow region 52 extends between the ledge 36 of the port 30 and the fitting first end 44. The inner conical hollow region first end 54 and the extension 72 of the diffuser 50 is flush with or abuts the fitting first end 44 while the inner conical hollow region second end 56 is flush with or abuts the ledge 36 of the port 30.

Figure 9:
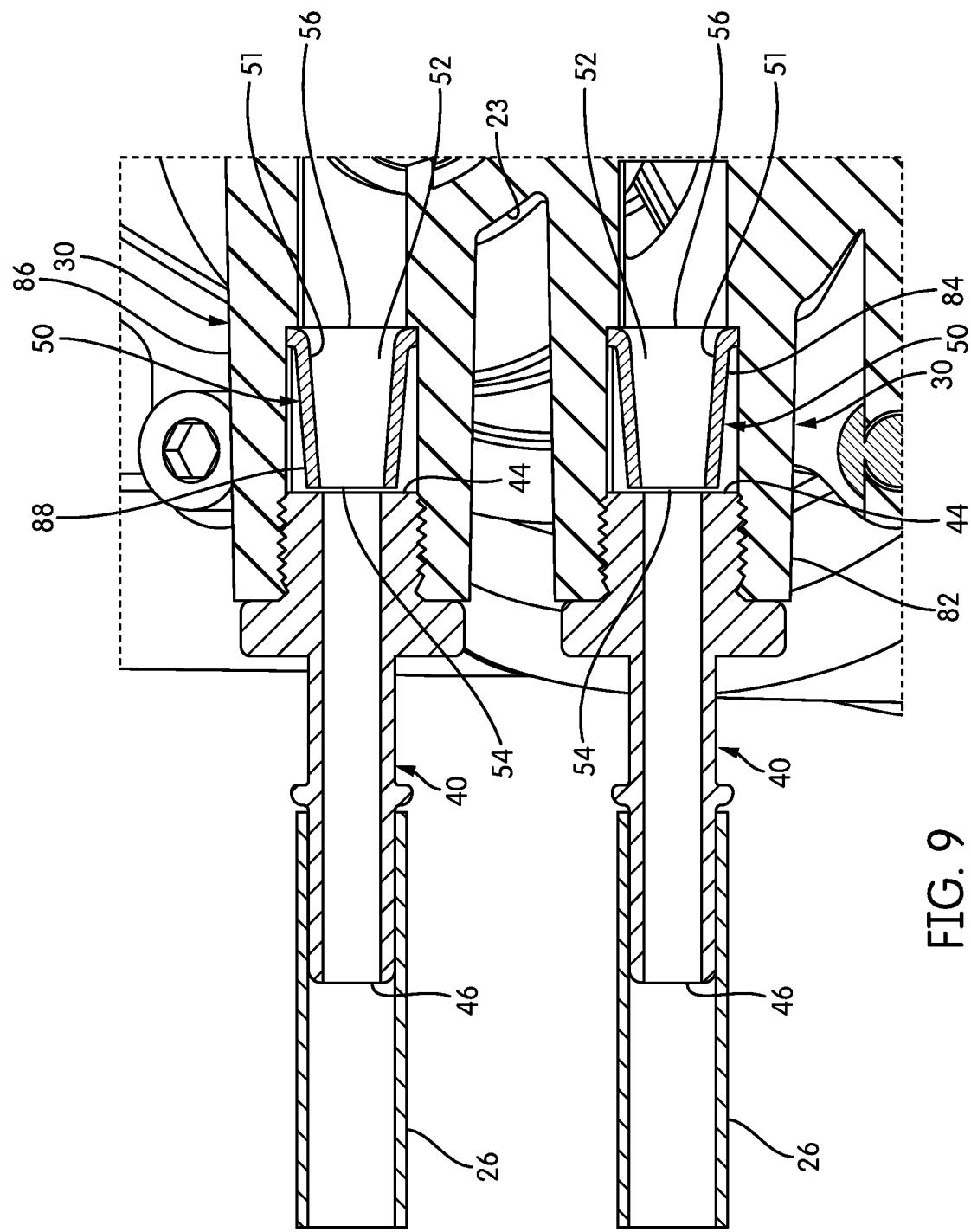
FIG. 9 is a cross-sectional view of a portion of a filter assembly according to another embodiment.

As shown in FIG. 9, the filter assembly 20 may comprise two ports 30. For example, one of the ports 30 may be an inlet port 82 and the other port 30 may be an outlet port 86. Each of the ports 82, 86 may have a diffuser 50 and a fitting 40, where each of the fittings 40 are connected to the filtration system component 26. In order to provide a smooth contraction or expansion of the fluid, the diffuser 50 in the inlet port 82 is an inlet diffuser 84 and the diffuser 50 in the outlet port 86 is an outlet diffuser 88.

The inner surface 51 at the inner conical hollow region second end 56 of the inlet diffuser 84 (e.g., the exit from the inlet diffuser 84) is at a substantially straight consistent angle in order to allow the fluid to flow and expand smoothly as the fluid flows from the inlet diffuser 84 into the channel 32 of the port 30. The inner surface 51 at the inner conical hollow region second end 56 of the outlet diffuser 88 (e.g., the entrance into the outlet diffuser 88) is curved, chamfered, or tapered outward in order to allow the fluid to flow and contract smoothly as the fluid flows from the channel 32 of the port 30 into the outlet diffuser 88 (instead of having an abrupt contraction of the fluid flow).

Alternatively or additionally, it is understood that the filter assembly 20 may have more than one inlet port 82 (with the inlet diffuser 84) and/or more than one outlet port 86 (with the outlet diffuser 88). It is also understood that the inlet diffuser 84 may be used within the outlet port 86 and the outlet diffuser 88 may be used within the inlet port 82.

The diffuser 50 is a separate, "add-on" component that can be retrofit into an existing filter assembly 20 with an existing port 30 and an existing fitting 40. Accordingly, the diffuser 50 can be used in conjunction with a variety of different types of off-the-shelf standard fittings 40 and adapt to a variety of different configurations. Regardless of the specific type of fitting 40, the diffuser 50 can be adapted to reduce the change in pressure within the filter assembly 20. The diffuser 50 may optionally be designed and made according to particular or individual filter assemblies 20 since filter assemblies 20 may each have different relative dimensions or available space.

The diffuser 50 can be constructed out of a variety of different materials, including but not limited to molded plastic. However, it is understood that the diffuser 50 may be machined, die-cast, or a cold-formed alloy.

Contraction Ring

Figure 14:
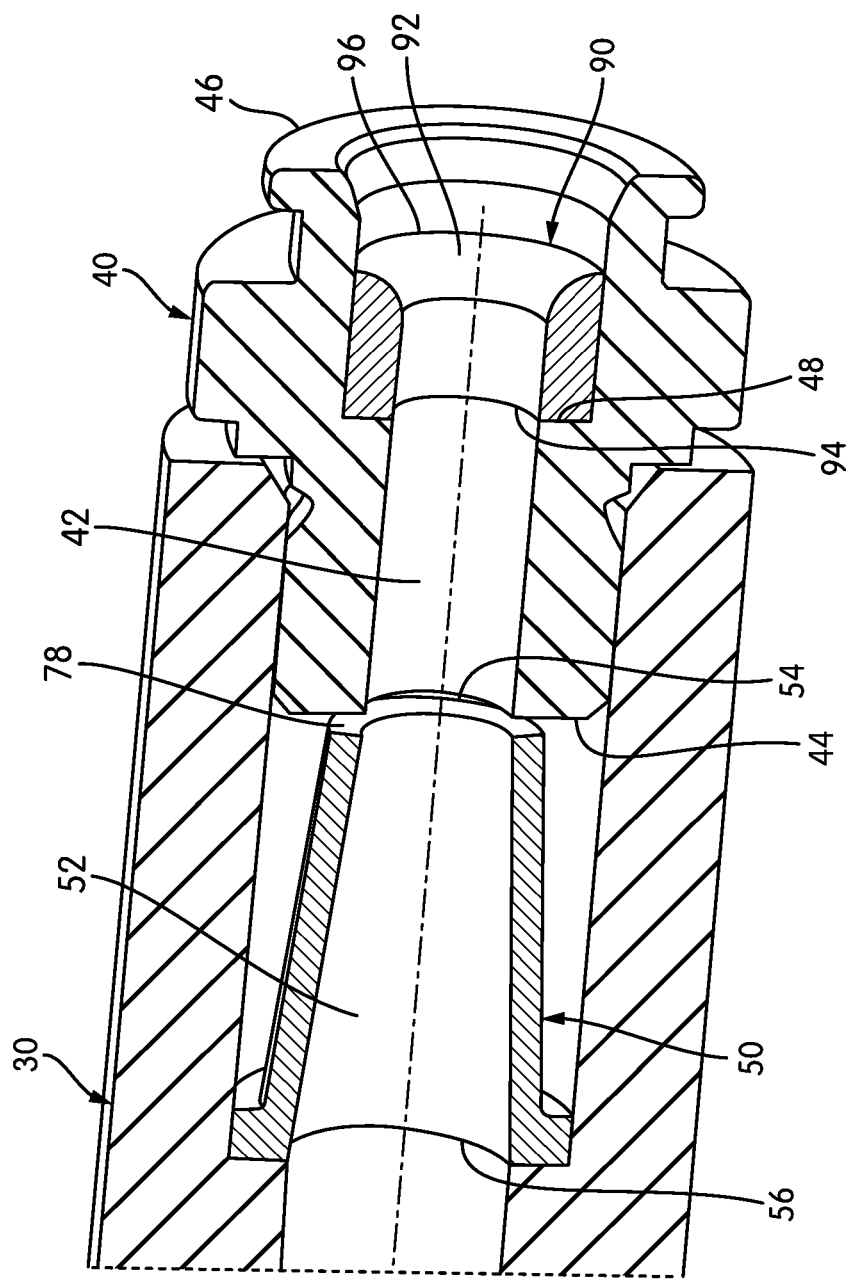
FIG. 14 is a cross-sectional view of a port, a diffuser, a fitting, and a contraction ring of a filter assembly according to still another embodiment.

As shown in FIG. 14, the filter assembly 20 may further comprise an additional component, such as a contraction ring 90, positioned within the channel 42 of the fitting 40. The contraction ring 90 comprises an angled, sloped, or chamfered edge 92 to gradually change the inner diameter of the fitting 40 between the larger inner diameter 47 at the fitting second end 46 and the smaller inner diameter 45 at the fitting first end 44. The chamfered edge 92 of the contraction ring 90 provides a smooth transition within the channel 42 of the fitting 40 between the larger inner diameter 47 and the smaller inner diameter 45, in particular while the fluid is flowing from the fitting 40 to the port 30. Without the contraction ring 90, the fitting 40 has an abrupt and sharp transition between the larger inner diameter 47 and the smaller inner diameter 45 at the ledge 48. With the contraction ring 90, the inner diameter of the fitting 40 is gradually and smoothly changed or transitioned between the larger inner diameter 47 and the smaller inner diameter 45 of the fitting 40, which allows the fluid to flow smoothly within the channel 42 of the fitting 40 while smoothly contracting (after (or while) entering into the fitting 40 and before entering into the diffuser 50) or expanding (after exiting the diffuser 50 and entering into the fitting 40). This smooth contraction or expansion of the fluid flow further reduces the pressure drop of the fitting 40.

The contraction ring 90 is inserted or press-fit into the fitting second end 46 of the channel 42 in the area of the fitting 40 with the larger inner diameter 47 (where the inner conical hollow region 52 of the diffuser 50 is positioned closer to the fitting first end 44 (than the fitting second end 46) and the area of the fitting 40 with the smaller inner diameter 45 (than the larger inner diameter 47)). As shown in FIG. 14, the contraction ring 90 is positioned near or proximate to the fitting second end 46 and directly abuts the ledge 48 of the fitting 40. The outer diameter of the contraction ring 90 is smaller than the inner diameter 47 of the fitting second end 46 in order to fit within the channel 42 of the fitting 40. However, the outer diameter of the contraction ring 90 is larger than the inner diameter 45 of the fitting first end 44 such that the contraction ring 90 does not move past the ledge 48.

In order to provide a smooth and continuous transition from the larger inner diameter 47 to the smaller inner diameter 45 of the fitting 40, the inner diameter at a contraction ring first end 94 of the contraction ring 90 is approximately equal to the inner diameter 45 of the fitting first end 44 and the inner diameter at a contraction ring second end 96 of the contraction ring 90 is approximately equal to the inner diameter 47 of the fitting second end 46.

Computational Fluid Dynamics (CFD) Simulation

Figure 1B:
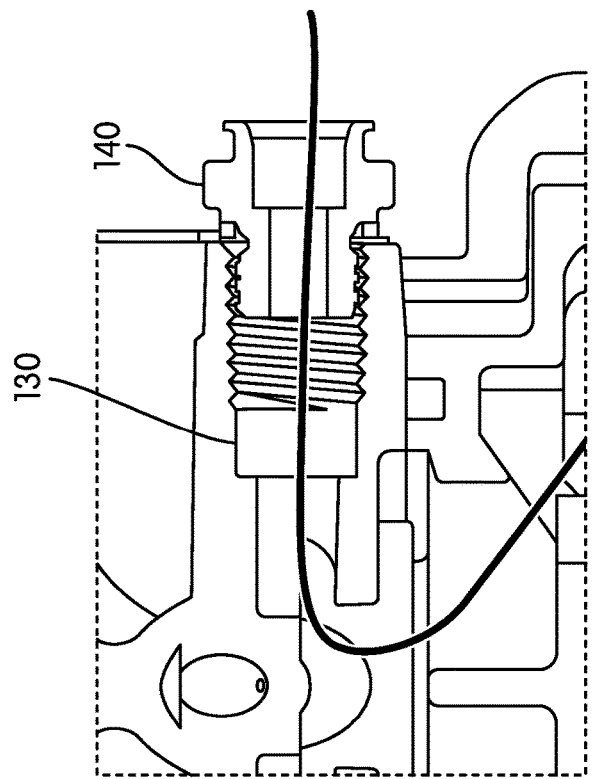
FIG. 1B is an enlarged view of the port and fitting of the conventional filter assembly of FIG. 1A.
Figure 1A:
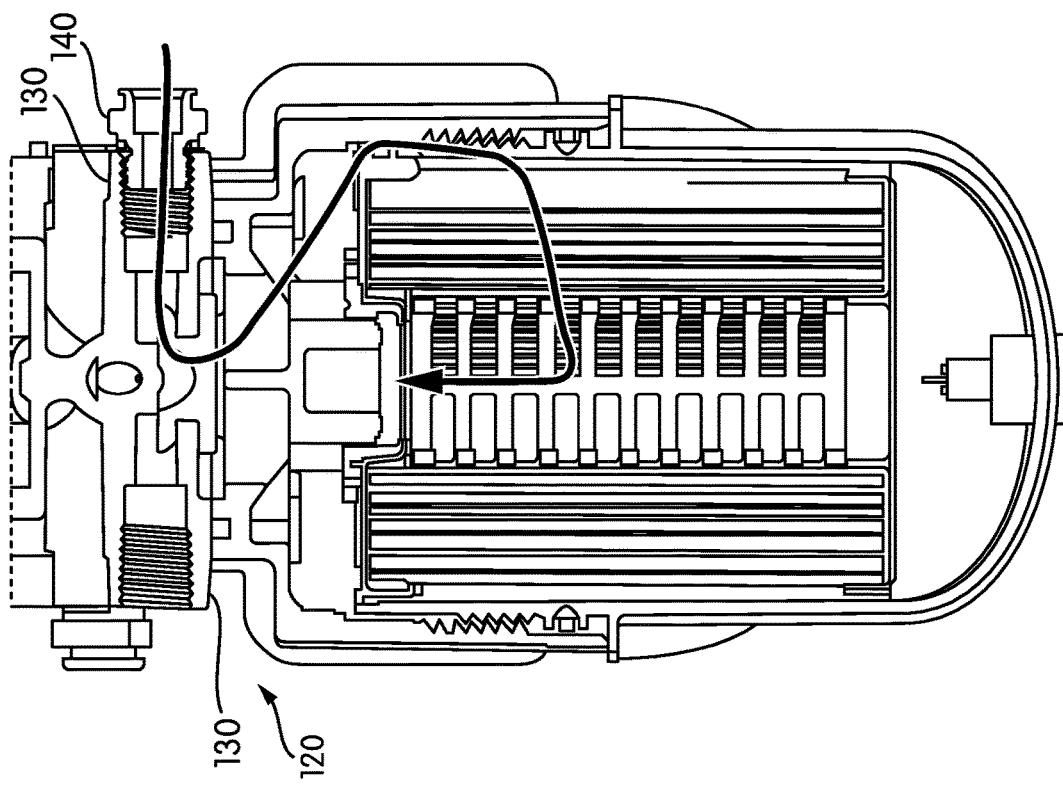
FIG. 1A is a cross-sectional view of a conventional filter assembly.
Figure 2:
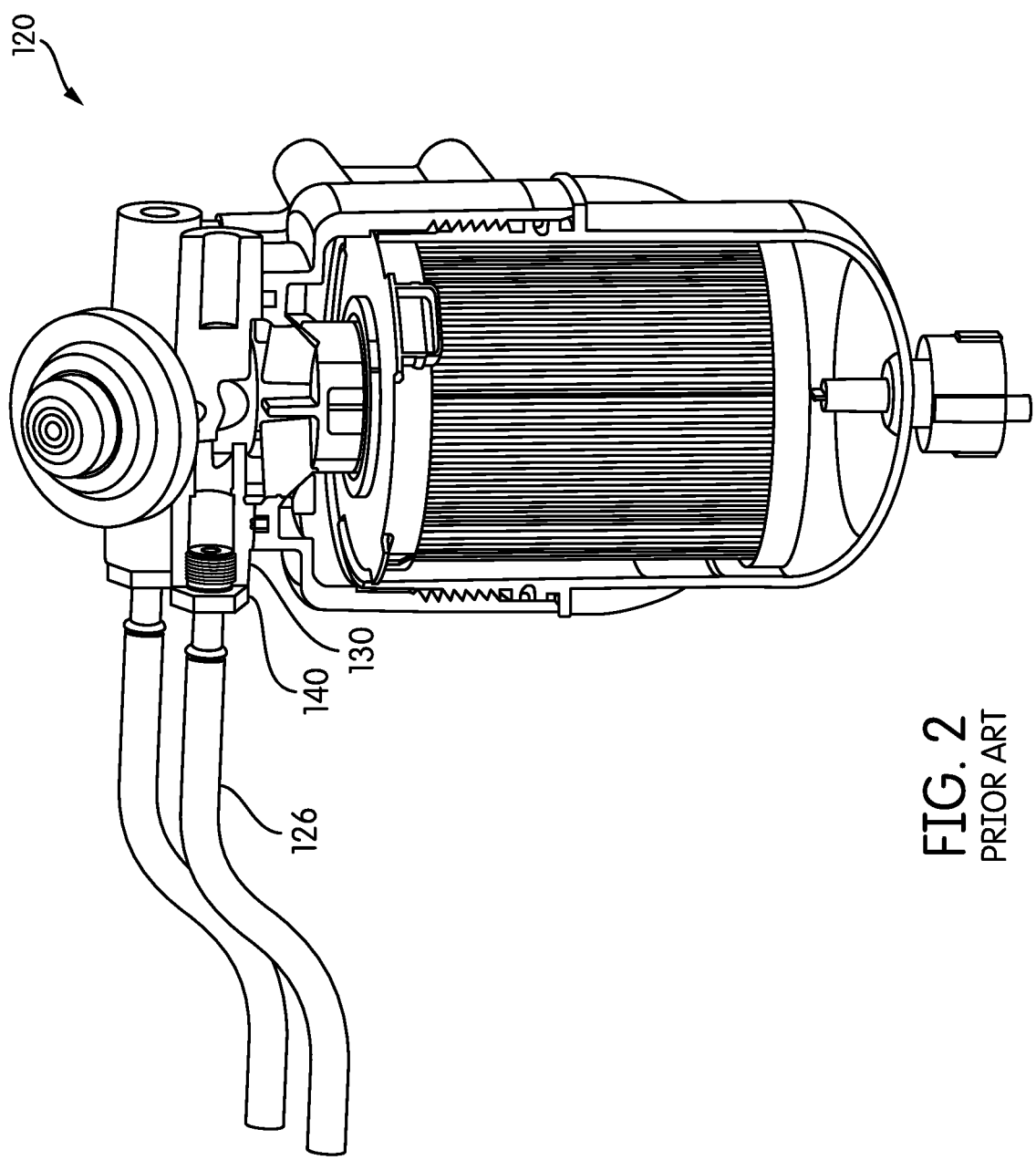
FIG. 2 is a partial cross-sectional, perspective view of another conventional filter assembly.
Figure 3:
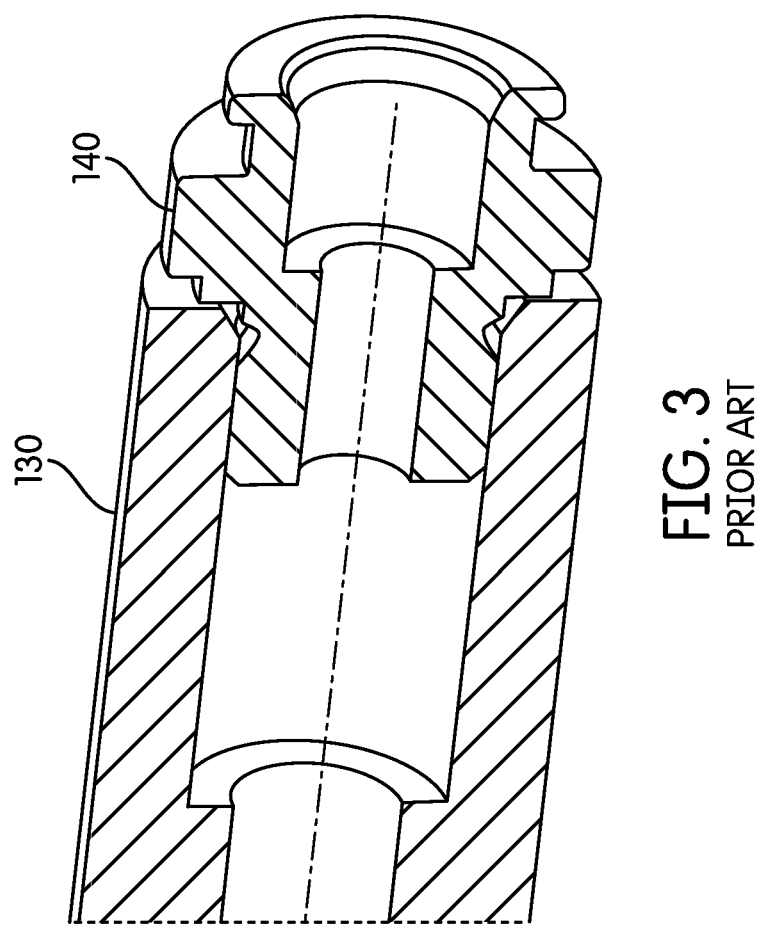
FIG. 3 is a cross-sectional view of a port and a fitting of a conventional filter assembly.
Figure 4:
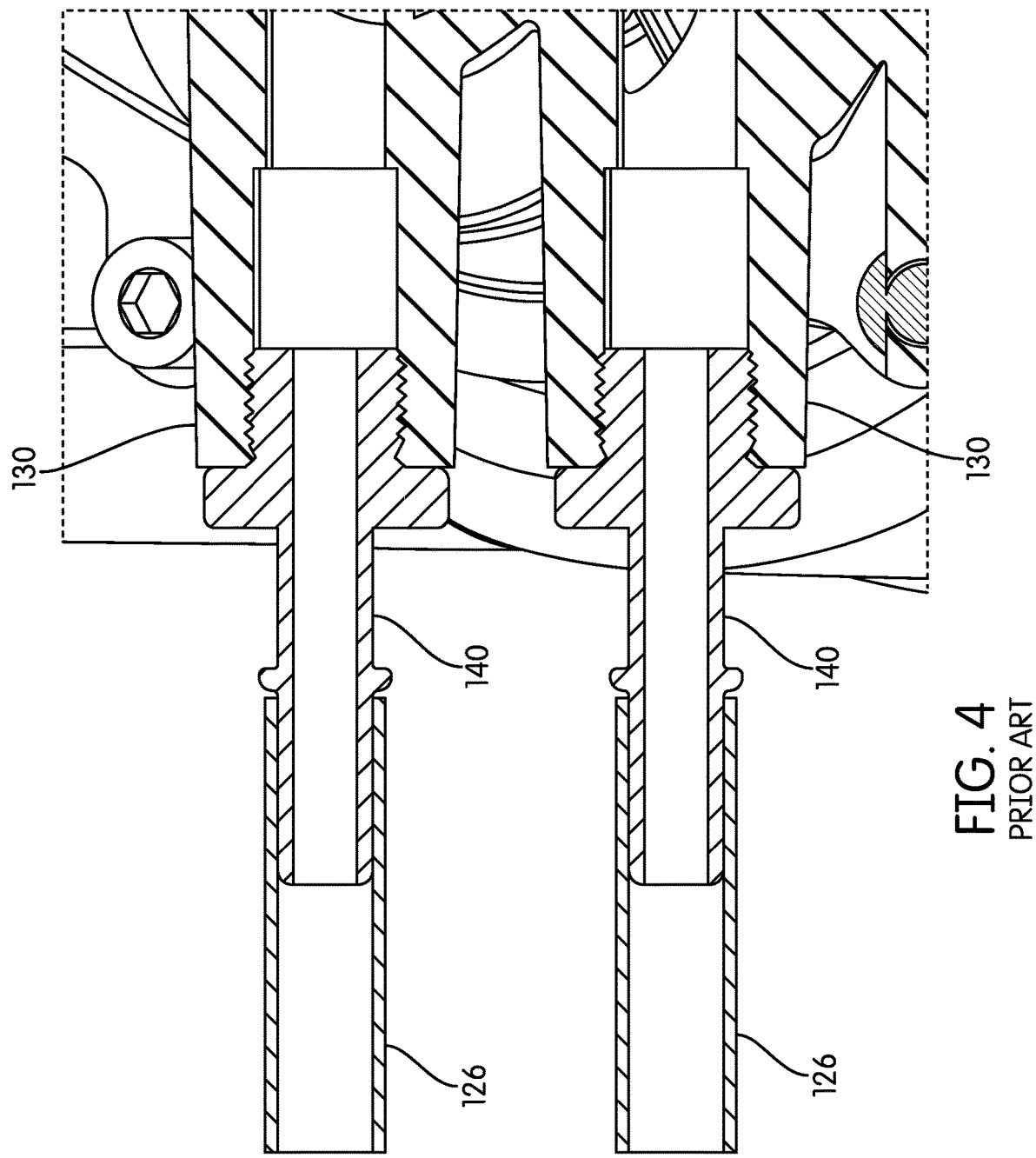
FIG. 4 is a cross-sectional view of two ports and two fittings of a conventional filter assembly.
Figure 5:
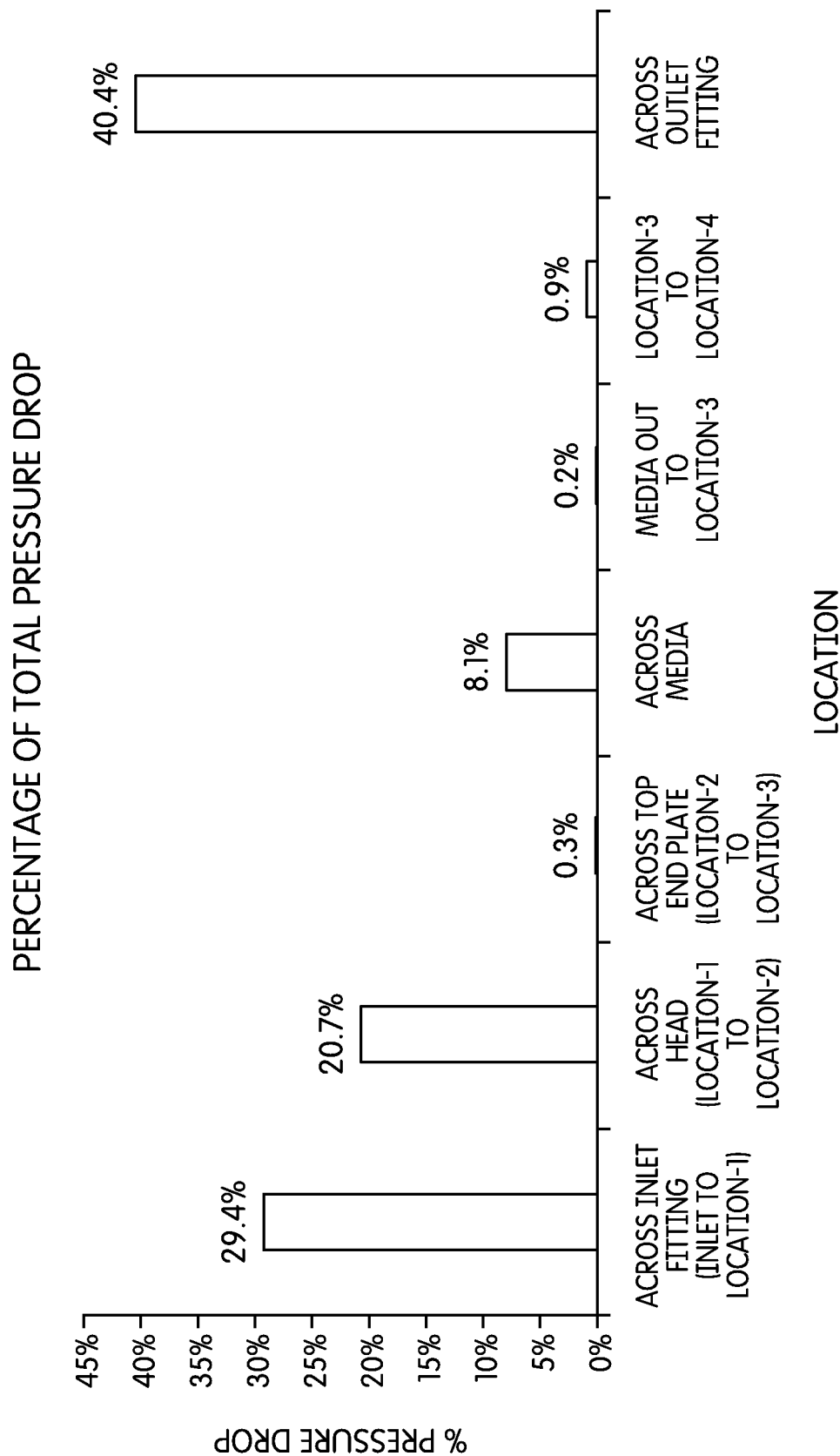
FIG. 5 is a graph of the percentage of total pressure drop in different locations within a conventional filter assembly.
Figure 6:
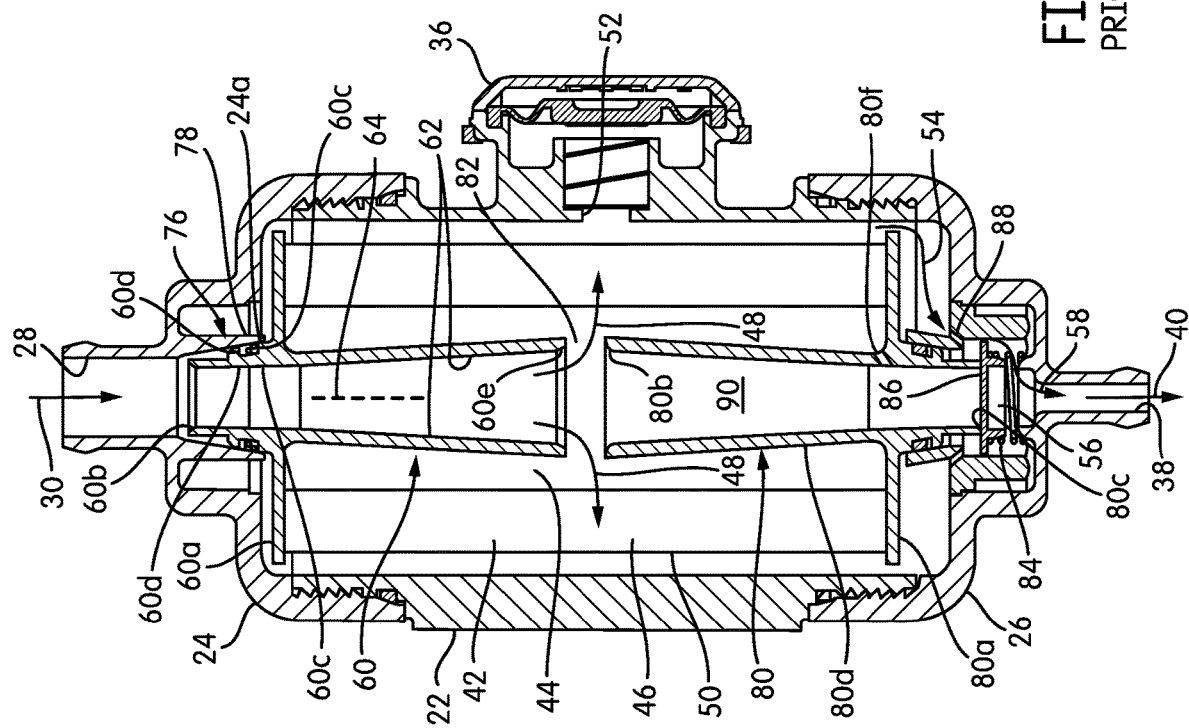
FIG. 6 is a cross-sectional view of another conventional filter assembly.
Figure 17:
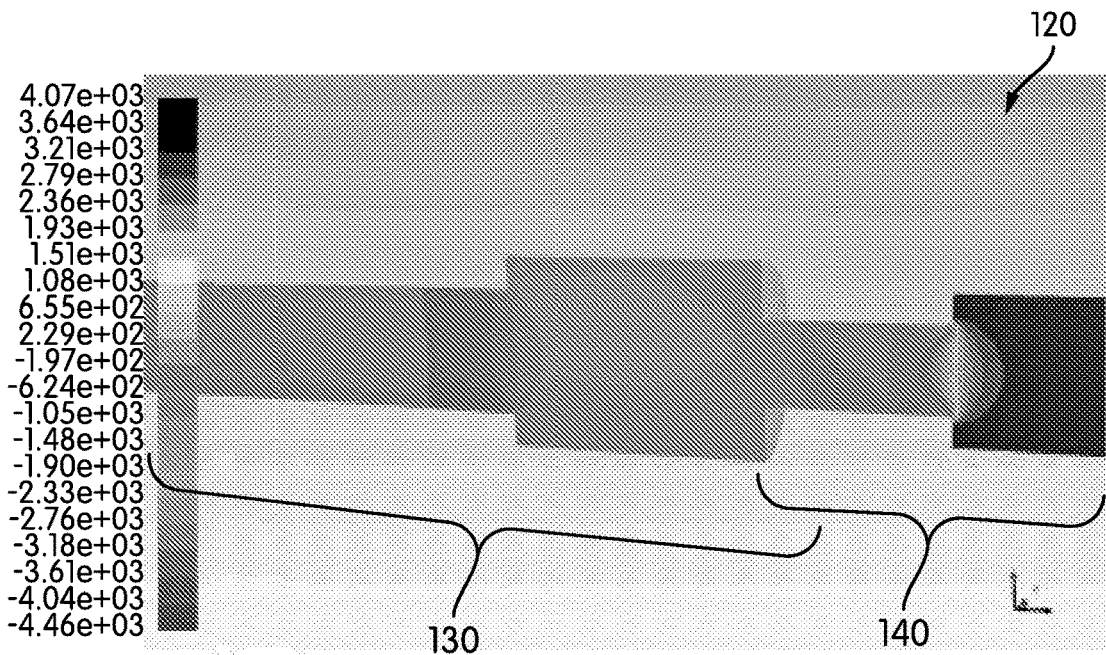
FIG. 17 shows a CFD simulation of a conventional filter assembly showing contours of static pressure.
Figure 18:
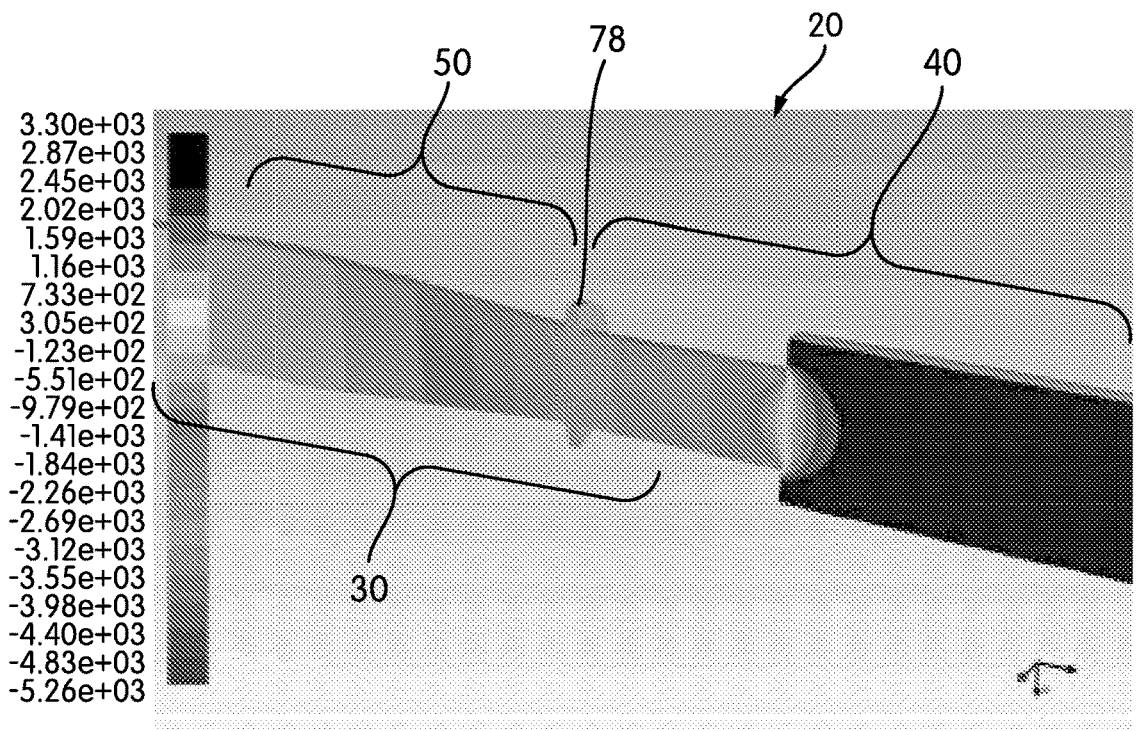
FIG. 18 shows a CFD simulation of a filter assembly with the diffuser of FIG. 10A showing contours of static pressure.
Figure 19:
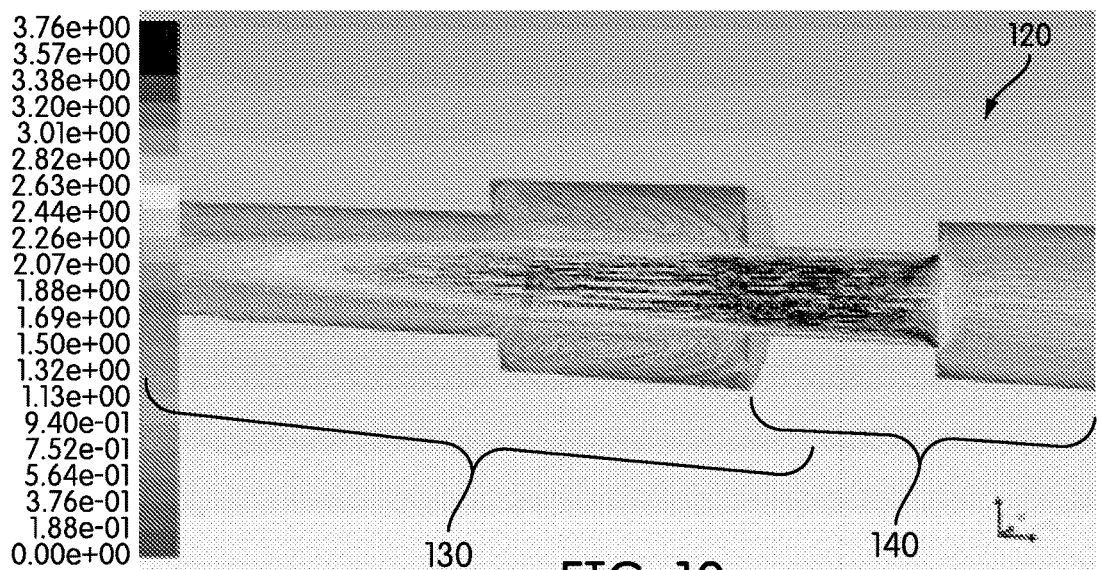
FIG. 19 shows a CFD simulation of a conventional filter assembly showing pathlines of velocity magnitude.
Figure 20A:
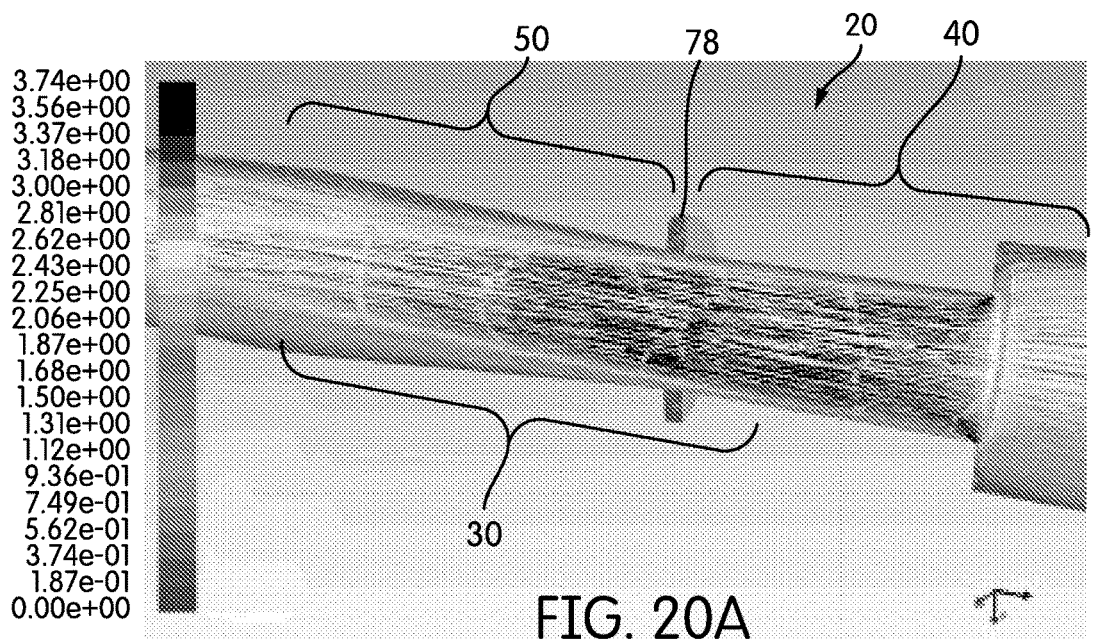
FIG. 20A shows a CFD simulation of a filter assembly with the diffuser of FIG. 10A showing pathlines of velocity magnitude.
Figure 20B:
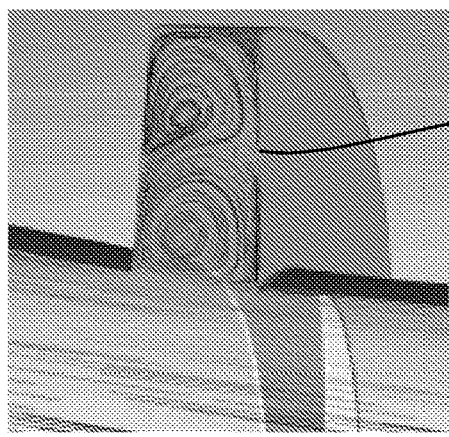
FIG. 20B is an enlarged view of a portion of FIG. 20A.
Figure 21:
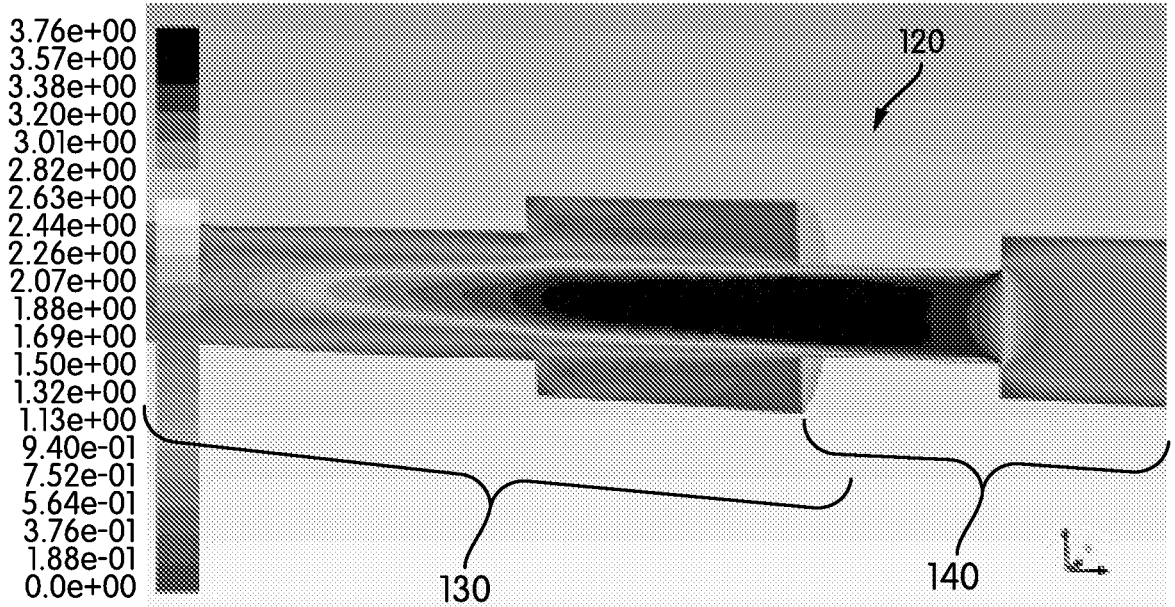
FIG. 21 shows a CFD simulation of a conventional filter assembly showing contours of velocity magnitude.

In FIGS. 17-22, CFD demonstrations, plots, modeling, or simulations are shown. FIGS. 17, 19, and 21 show CFD simulations within a filter assembly 120 without a diffuser (i.e., the filter assembly 120 of FIG. 1). FIGS. 18, 20A-20B, and 22 show CFD simulations within a filter assembly 20 with the diffuser 50 (i.e., the diffuser 50 of FIGS. 10A-10B). By providing the diffuser 50 within the filter assembly 20, the CFD simulations show an appreciable pressure recovery. For example, the change in pressure of the fluid flow may be reduced by 20%. More specifically, FIG. 17 shows a CFD simulation of a filter assembly 120 without a diffuser in which the change in pressure is 4.07 kilopascals (kPa). By including the diffuser 50 within the filter assembly 20, as shown in FIG. 18, the change in pressure is reduced to 3.3 kPa or less.

FIGS. 17 and 18 show contours of static pressure of the fluid. As shown in FIG. 17, the filter assembly 120 (without a diffuser) has a large static pressure loss caused by the relatively small inner diameter of the fitting 140. The filter assembly of FIG. 17 has approximately a 4.07 kPa loss across the full geometry of the fitting 140 and the port 130, as shown by the top number in the legend of FIG. 17. As shown in FIG. 18, the filter assembly 20 (with the diffuser 50) has a relatively smaller static pressure loss of approximately 3.3 kPa. Accordingly, the diffuser 50 reduces the pressure loss by approximately 19%.

FIGS. 19 and 20A-20B show flow streamlines or pathlines of velocity magnitude within the filter assembly 120 without a diffuser (FIG. 19) and the filter assembly 20 with the diffuser 50 (FIGS. 20A-20B), where the fluid is flowing from the right to left on a symmetry plane. The flow streamlines show the fluid velocity as the fluid flows from the fitting 140 to the port 130 (FIG. 19) or from the fitting 40, through the diffuser 50, and to the port 30 (FIG. 20A). In FIGS. 19 and 20A-20B, the fluid is a diesel fuel flowing at approximately 4 liters/minute (L/min) at a viscosity of 3 centipoise (cP). The inner diameter of the fittings 140 and 40 is approximately 5.3 millimeters (mm).

As shown in FIG. 19, the fluid has a high velocity as it flows through the relatively small inner diameter of the fitting 140. As the fluid flows into the relatively large inner diameter of the port 130, the fluid expands radially outward into the port 130. As shown, the fluid has a relatively lower velocity within the port 130 as the fluid "stalls" or recirculates within the port 130. Accordingly, the filter assembly 120 without the diffuser creates a high pressure loss.

As shown in FIGS. 20A-20B, the streamlines of the fluid smoothly expand in the diffuser 50 as the diffuser 50 diffuses the velocity of the fluid. As shown in FIG. 20B, the fluid has only a small amount of "stalling" (e.g., recirculating flow) due to and within the gap 78 between the diffuser 50 and the fitting first end 44. However, since the gap 78, and therefore the amount of "stalling" is so small, it does not cause any significant detrimental effects on the fluid flow such as pressure loss. Accordingly, the diffuser 50 reduces the pressure loss by 19-20%, or even as much as 40-50%.

Figure 22:
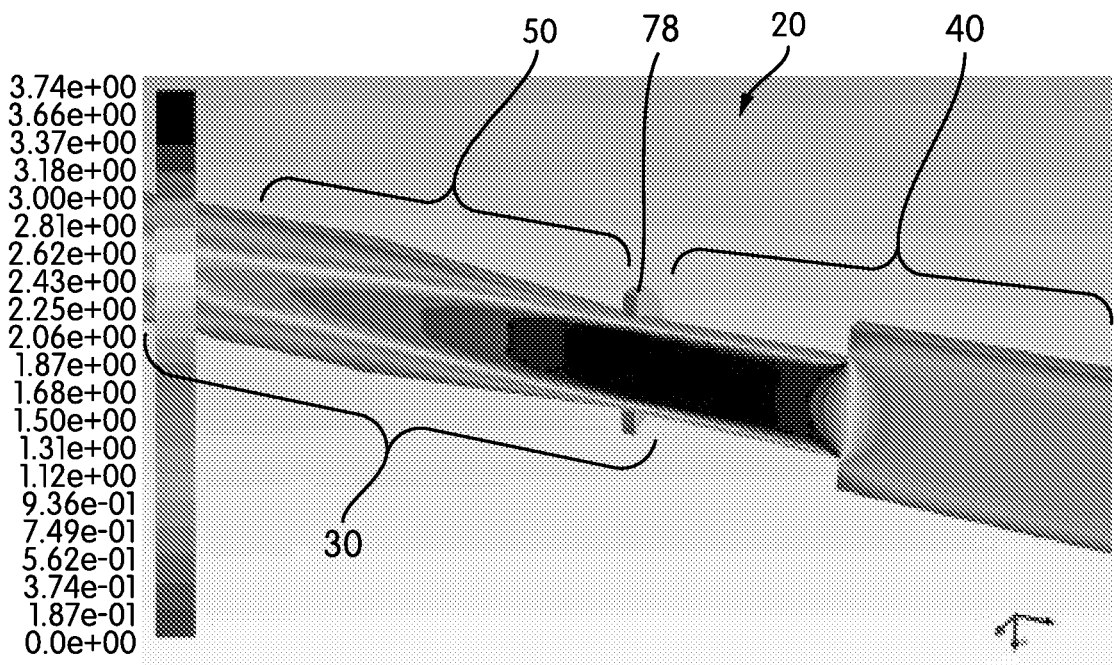
FIG. 22 shows a CFD simulation of a filter assembly with the diffuser of FIG. 10A showing contours of velocity magnitude.

FIGS. 21 and 22 also show the contours of the velocity magnitude of the fluid and how adding the diffuser 50 improves the performance of the filter assembly 20.

It is anticipated that the various embodiments and components described herein may be used alone or in conjunction with each other and in variety of different configurations.

As utilized herein, the terms "about," "substantially," "approximately," and similar terms are intended to have a broad meaning in harmony with the common and accepted usage by those of ordinary skill in the art to which the subject matter of this disclosure pertains, and such terms should be interpreted as encompassing the relevant term (i.e., "approximately equal" includes "equal"). It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," "attached," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter assembly, comprising:
   a filter head;
   a port extending from a portion of the filter head and defining a channel for fluid to flow into or out of the filter head, the port comprising a ledge formed within the channel;
   a fitting extending between a fitting first end and a fitting second end thereof, the fitting first end attachable to the port and the fitting second end attachable to a filtration system component; and
   a diffuser positionable within the channel of the port and between the ledge of the port and the fitting first end, the diffuser comprising an inner surface and an outer surface, the inner surface defining an inner conical hollow region extending between an inner conical hollow region first end and an inner conical hollow region second end, the inner surface extending at a nonzero angle relative to the direction of flow between the inner conical hollow region first end and the inner conical hollow region second end such that a first inner diameter of the diffuser at the inner conical hollow region first end is smaller than a second inner diameter of the diffuser at the inner conical hollow region second end.

2. The filter assembly of claim 1, wherein the diffuser comprises a first ring, wherein the outer diameter of the first ring is less than an inner diameter of a distal region of the port and greater than an inner diameter of a proximal region of the port, and wherein the distal region and the proximal region of the port are divided by the ledge.

3. The filter assembly of claim 2, wherein the first ring directly abuts the ledge of the port.

4. The filter assembly of claim 3, wherein the diffuser comprises a second ring, wherein the outer diameter of the second ring is less than the inner diameter of the distal region of the port and greater than the inner diameter of the proximal region of the port, and wherein the second ring is spaced from the first ring along the length of the diffuser.

5. The filter assembly of claim 2, wherein the second inner diameter of the diffuser at the inner conical hollow region second end is approximately equal to the inner diameter of the proximal region of the port.

6. The filter assembly of claim 1, wherein the length of the diffuser is approximately equal to the distance between the ledge of the port and the fitting first end of the fitting.

7. The filter assembly of claim 1, wherein the length of the diffuser is less than the distance between the ledge of the port and the fitting first end of the fitting such that a gap is created between the inner conical hollow region first end of the diffuser and fitting first end of the fitting.

8. The fitting assembly of claim 1, wherein the length of the diffuser is greater than the distance between the ledge of the port and the fitting first end of the fitting such that the inner conical hollow region first end extends into the fitting.

9. The filter assembly of claim 1, wherein the distal region of the port is the region between the ledge of the port and the fitting first end, wherein the largest outer diameter of the diffuser is smaller than the inner diameter of the distal region of the port such that the diffuser fits within the distal region of the port.

10. The filter assembly of claim 1, wherein the first inner diameter of the diffuser at the inner conical hollow region first end is approximately equal to the inner diameter at the fitting first end of the fitting.

11. The filter assembly of claim 1, wherein the outer diameter of the inner conical hollow region first end is less than the inner diameter of the fitting first end such that the inner conical hollow region first end extends into the fitting first end.

12. The filter assembly of claim 1, wherein the diffuser comprises extension that extends radially outwardly around the outer surface of the diffuser, wherein the outer diameter of the extension is larger than the inner diameter of the fitting at the fitting first end, wherein the extension directly abuts the fitting first end of the fitting.

13. The filter assembly of claim 12, wherein the diffuser comprises a lip that extends along the length of the diffuser beyond the extension and fits within the first fitting end of the fitting.

14. The filter assembly of claim 1, wherein the diffuser comprises at least one projection that extends into and snap fits with the fitting.

15. The fitting assembly of claim 14, wherein the projection extends beyond the inner conical hollow region first end and is inserted into the fitting.

16. The filter assembly of claim 1, further comprising a contraction ring positioned within the fitting, wherein the contraction ring comprises a chamfered edge.

17. The filter assembly of claim 16, wherein the contraction ring is positioned proximate to the fitting second end.

18. The filter assembly of claim 1, wherein the diffuser one of allows fluid to conically contract or conically expand along the length of the diffuser.

19. The filter assembly of claim 1, wherein the diffuser is only secured directly to one of the port or the fitting.

20. The filter assembly of claim 1, wherein the port is one of a fluid inlet port or a fluid outlet port.

21. A filter assembly, comprising:
a filter body;
a port extending from a portion of the filter body and defining a channel for fluid to flow into or out of the filter body, the port comprising a ledge formed within the channel, and being attachable to a fitting first end of a fitting; and
a diffuser positionable within the channel of the port and between the ledge of the port and the fitting first end, the diffuser comprising an inner surface and an outer surface, the inner surface defining an inner conical hollow region extending between an inner conical hollow region first end and an inner conical hollow region second end, the inner surface extending at a nonzero angle relative to the direction of flow between the inner conical hollow region first end and the inner conical hollow region second end such that a first inner diameter of the diffuser at the inner conical hollow region first end is smaller than a second inner diameter of the diffuser at the inner conical hollow region second end.

22. The filter assembly of claim 21, wherein the diffuser comprises a first ring, wherein the outer diameter of the first ring is less than an inner diameter of a distal region of the port and greater than an inner diameter of a proximal region of the port, and wherein the distal region and the proximal region of the port are divided by the ledge.

* * * * *